(12) United States Patent
Mase et al.

(10) Patent No.: US 11,660,827 B2
(45) Date of Patent: May 30, 2023

(54) ELASTIC ABRASIVE MANUFACTURING METHOD, ELASTIC ABRASIVE MANUFACTURING DEVICE, BLASTING METHOD, AND BLASTING DEVICE

(71) Applicant: FUJI MANUFACTURING CO., LTD., Tokyo (JP)

(72) Inventors: Keiji Mase, Tokyo (JP); Shozo Ishibashi, Tokyo (JP); Masatoshi Kitagami, Tokyo (JP)

(73) Assignee: FUJI MANUFACTURING CO., LTD., Tokyo (JP)

( * ) Notice: Subject to any disclaimer, the term of this patent is extended or adjusted under 35 U.S.C. 154(b) by 388 days.

(21) Appl. No.: 17/038,836

(22) Filed: Sep. 30, 2020

(65) Prior Publication Data

US 2021/0260723 A1 Aug. 26, 2021

(30) Foreign Application Priority Data

Feb. 20, 2020 (JP) .............................. JP2020-027310

(51) Int. Cl.
*B24C 9/00* (2006.01)
*B29C 70/00* (2006.01)
(Continued)

(52) U.S. Cl.
CPC .............. *B29C 70/00* (2013.01); *B24C 9/006* (2013.01); *B24C 5/02* (2013.01); *B24C 7/0046* (2013.01)

(58) Field of Classification Search
CPC .. B24C 9/006; B24C 1/10; B24C 1/08; B24C 1/083; B24C 1/086; B24C 5/02;
(Continued)

(56) References Cited

U.S. PATENT DOCUMENTS

| 7,695,346 B2 | 4/2010 | Ishibashi et al. |
| 10,131,036 B2 | 11/2018 | Mase et al. |
| 2015/0093969 A1* | 4/2015 | Mase ...................... B24C 9/006 |
| | | 118/712 |

FOREIGN PATENT DOCUMENTS

| JP | S55-98565 A | 7/1980 |
| JP | 2957492 B2 | 10/1999 |

(Continued)

*Primary Examiner* — Monica S Carter
*Assistant Examiner* — Abbie E Quann
(74) *Attorney, Agent, or Firm* — Ronald M. Kachmarik; Cooper Legal Group LLC

(57) ABSTRACT

A re-circulatory blasting device obtained is capable of performing stable treatment for a prolonged period of time even in cases in which an elastic abrasive employed has abrasive grains adhered to the surface of elastic cores. An elastic abrasive regeneration device provided to the blasting device regenerates elastic abrasive employed for re-circulation. The elastic abrasive regeneration device includes a mixer and a combining unit. Recovered abrasive fed in from an abrasive recovery section is mixed in the mixer with abrasive grains fed in from an abrasive grain feeder, and the abrasive grains are adhered to the surface of the cores of the recovered abrasive. In the combining unit, the abrasive grains are pressed against and combined to the surface of the cores by passing an aggregated state of the recovered abrasive mixed by the mixer along a constricted flow path having a flow path cross-sectional area that gradually narrows.

10 Claims, 14 Drawing Sheets

(51) Int. Cl.
*B24C 5/02* (2006.01)
*B24C 7/00* (2006.01)

(58) Field of Classification Search
CPC .............. B24C 7/0046; B24D 18/0027; B24D 18/0054; B24D 18/0072; B24D 18/009; B24D 3/22; B24D 3/24; B24D 3/26; B29C 70/00
USPC .......................................................... 451/38
See application file for complete search history.

(56) References Cited

FOREIGN PATENT DOCUMENTS

| | | | |
|---|---|---|---|
| JP | 2001-207160 | A | 7/2001 |
| JP | 2006-159402 | A | 6/2006 |
| JP | 6254409 | B2 | 12/2017 |

* cited by examiner

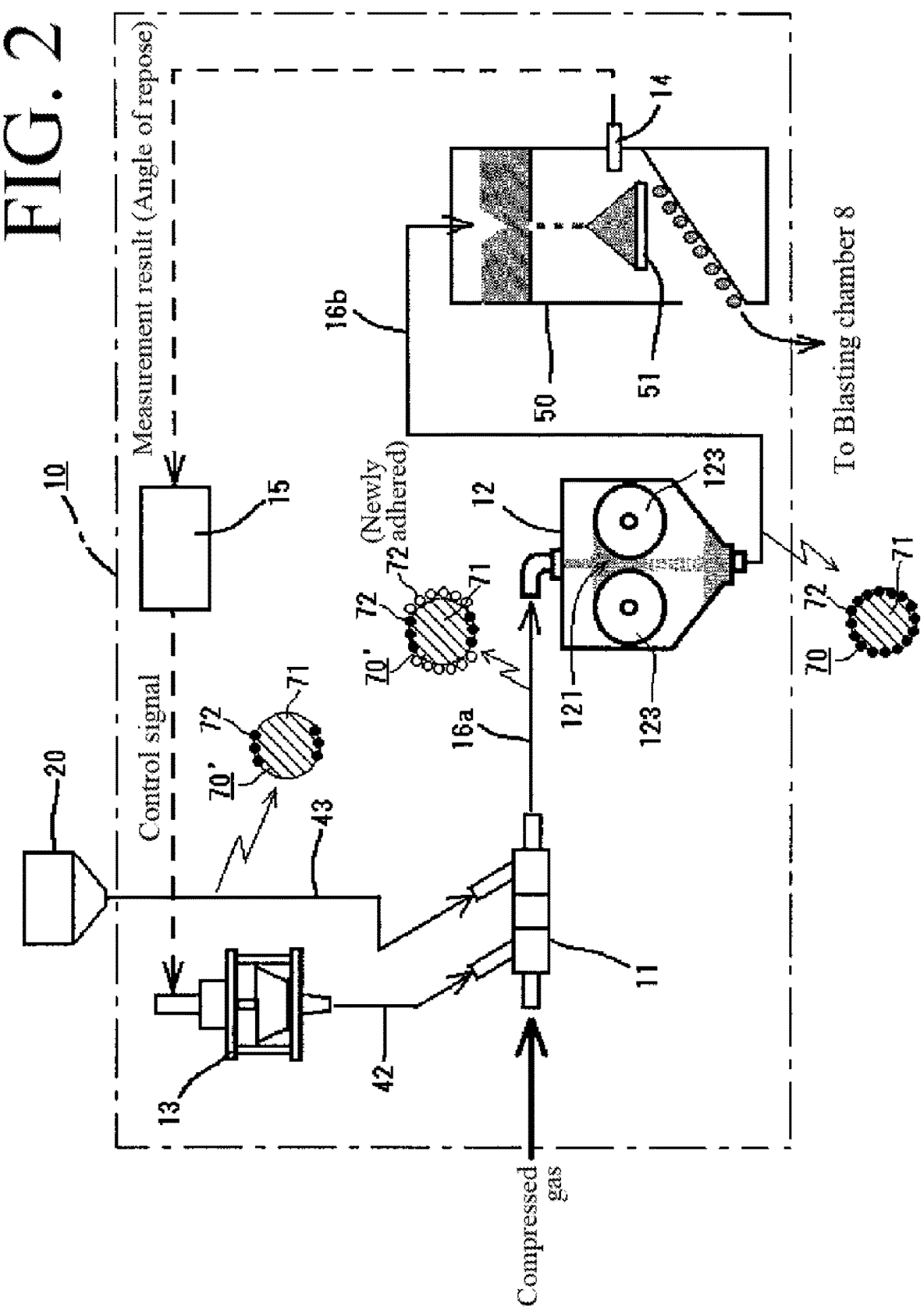

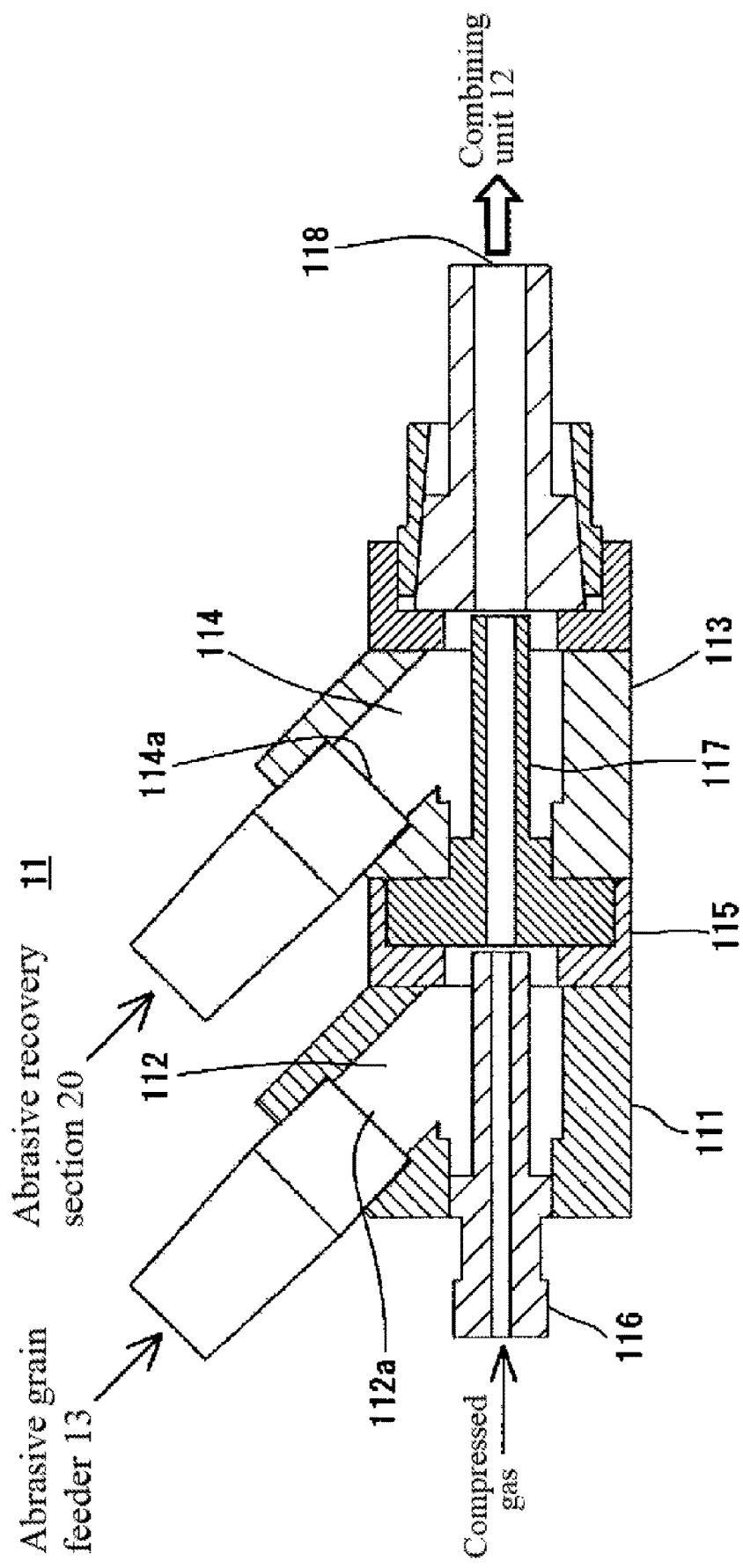

ELASTIC ABRASIVE MANUFACTURING METHOD, ELASTIC ABRASIVE MANUFACTURING DEVICE, BLASTING METHOD, AND BLASTING DEVICE

BACKGROUND OF THE INVENTION

1. Field of the Invention

The present invention relates to a method for manufacturing an elastic abrasive, to an elastic abrasive manufacturing device, to a blasting method, and to a blasting device. In particular the present invention relates to a method for manufacturing an elastic abrasive having a structure in which abrasive grains have been adhered to the surface of elastic cores, to an elastic abrasive manufacturing device to execute the manufacturing method, and to a re-circulatory blasting method or blasting device of a configuration that includes the elastic abrasive manufacturing method or manufacturing device to regenerate elastic abrasive employed in re-circulation.

Note that "manufacturing" of the elastic abrasive in the present invention includes, in addition to adhering abrasive grains to the surface of unused cores, "regeneration" in which cores of elastic abrasive in a state in which abrasive grains have become detached from the surface of the cores due to use (including a state in which some abrasive grains still remain on the surface), then have abrasive grains re-adhered to the core surface.

2. Description of the Related Art

There are proposals for various types of elastic abrasives having abrasive grains supported on cores, such as elastic abrasives in which abrasive grains are kneaded into elastic cores or elastic abrasives in which abrasive grains are adhered to the surface of elastic cores (see Japanese Patent No. 2957492, Japanese Patent KOKAI (LOPI) No. 2001-207160, and microfilm of Japanese Utility Model Application No. S53-178398 (Japanese Utility Model Application Publication No S55-98565)). By performing blasting employing such elastic abrasives, the shock when impacting a workpiece is absorbed by the elasticity of the cores, and as a result this enables treatment such as polishing a workpiece and removing an oxidized film or burrs from a workpiece to be performed while suppressing a matt (satin) finish from being formed on the surface of a workpiece, as would occur when ordinary blasting is performed.

In particular, for elastic abrasives employing cores with suppressed impact resilience to prevent recoil at impact, causing the ejected elastic abrasive to slide over the surface of a workpiece has enabled mirror finish polishing to be performed, which was not possible with conventional blasting, and is making a significant contribution to expanding the range of fields for treatment by blasting (see Japanese Patent KOKAI (LOPI) No. 2006-159402).

Structures of such elastic abrasives include elastic abrasives in which abrasive grains are supported by cores by kneading the abrasive grains into cores configured by an elastic material such as rubber (see microfilm of Japanese Utility Model Application No. S53-178398 (Japanese Utility Model Application Publication No S55-98565)), as well as structures in which abrasive grains are adhered to the surface of cores, such as cores configured from plant fibers including an oil or sugar component with adhesive properties (Japanese Patent No. 2957492), or cores made from gelatin that exhibits both adhesive properties and elasticity due to containing a water component (Japanese Patent KOKAI (LOPI) No. 2001-207160).

From out of such elastic abrasives, in cases in which blasting is performed using an elastic abrasive having a structure in which abrasive grains have been adhered to the surface of cores, the abrasive grains adhered to the surface of the cores of the elastic abrasive are fallen off by shock and friction during impact, resulting in the quantity of abrasive grains adhered to the core surface reducing as the number of times of impact against the workpiece increases.

This means that when blasting is performed using an elastic abrasive in a re-circulatory type blasting device, as illustrated in FIG. 10, the cutting performance of the elastic abrasive gradually decreases with the passage of time, resulting in a large difference arising in surface state, such as glossiness or mirror finish, between a state of treatment of a workpiece when treatment was performed employing the elastic abrasive in a new state, and a state of treatment of a workpiece when treatment was performed employing the elastic abrasive that has already been used repeatedly.

Even in cases in which the elastic abrasive is replaced with new elastic abrasive at prescribed intervals of time in order to prevent such changes in treatment state from occurring, although there is a temporary increase in cutting rate directly after replacement, from then onwards the cutting rate decreases with the passage of time. The cutting rate accordingly becomes unstable and changes as illustrated in FIG. 10, meaning that, as before, performing treatment to a workpiece at a constant quality remains unattainable.

In order to address this issue, in cases in which blasting is performed using elastic abrasive with a structure in which abrasive grains are adhered to the surface of cores, there is a need to either perform batch processing while replacing the elastic abrasive after each batch use, or a need to replace elastic abrasive being used by re-circulation with new elastic abrasive several times at short intervals. This results in a higher cost due to the increase in the amount of elastic abrasive consumed, and suffers from the problem of there being a significant decrease in productivity due to interrupting blasting operation each time the elastic abrasive is replaced.

In consideration of such problems, the inventors of the present invention have submitted a patent application for a blasting device incorporating an elastic abrasive regeneration device, and already received a patent therefor (see Japanese Patent No. 6254409).

The elastic abrasive regeneration device provided in this blasting device includes a mixer and a combining unit. The combining unit mixes some recovered abrasive that has been recovered in an abrasive recovery section of the blasting device together with abrasive grains fed in from an abrasive grain feeder and feeds these into a gas flow to generate a solid-gas two-phase flow in which the abrasive grains and cores are mixed together. The combining unit includes a convoluted space, for example a spiral shaped pipeline, through which the solid-gas two-phase flow generated in the mixer is passed.

At least a portion of the elastic abrasive employed for re-circulation can be regenerated by adhering abrasive grains to the surface of cores of recovered abrasive by mixing in the mixer, and by then pressing the abrasive grains against and combining the abrasive grains to the surface of cores using propulsive force of the solid-gas two-phase flow or centrifugal force when being passed through the combining unit including the convoluted space (see Japanese Patent No. 6254409).

In blasting performed with elastic abrasive using re-circulation, in order to perform blasting such as polishing at a constant quality for a prolonged period of time, the abrasive grains need to be combined to the surface of the cores at high density and with high strength so as to make the abrasive grains adhered to the surface of the cores difficult to fall off and such that the treatment properties do not change greatly even if a small amount of the abrasive grains is actually fallen off. The abrasive grains accordingly need to be sufficiently pressed against the surface of cores when combining the abrasive grains to the core surface in order to combine the abrasive grains with high density and high strength.

Thus in the elastic abrasive regeneration device of Japanese Patent No. 6254409, after the abrasive grains have been adhered to the surface of the cores using the adhesive properties of the cores by mixing in the mixer 11, the solid-gas two-phase flow including such cores is fed into the convoluted space of the combining unit, which is a spiral shaped space in this example, and the abrasive grains that have been adhered to the surface of the cores by propulsive force of the solid-gas two-phase flow or centrifugal force when passing through the convoluted space, are further pressed against the surface of the cores and strongly combined thereto.

However, the convoluted space referred to above needs to be provided over a comparatively long distance in order to strongly combine the abrasive grains to the surface of the cores using the above method.

Moreover, the most appropriate pressing force to combine the abrasive grains to the cores varies according to the physical properties of the cores employed (for example, the hardness, extensibility, coefficient of restitution, adhesive strength, grain size), the physical properties of the abrasive grains being adhered (for example, the grain size and shape, and material), and the environmental conditions (temperature, humidity, and the like). Thus adjusting the pressing force of the abrasive grains against the surface of the cores is difficult in the method described in Japanese Patent No. 6254409.

There is accordingly a desire to develop an elastic abrasive manufacturing method and manufacturing device that, similarly to the method described in Japanese Patent No. 6254409, enables abrasive grains to be strongly combined to the surface of cores, but employs a simpler configuration while also enabling adjustment of the pressing force of the abrasive grains to the surface of the cores.

The present invention addresses such a desire, and an object of the present invention is to provide an elastic abrasive manufacturing method and manufacturing device that enables abrasive grains to be pressed against cores and strongly combined thereto, similarly to in the combining process and combining unit adopted in Japanese Patent No. 6254409, but employs a comparatively simpler configuration, and preferably includes a combining process and combining unit capable of comparatively easily adjusting the pressing force of the abrasive grains against the surface of the cores. An object is also to provide a re-circulatory blasting method and blasting device that, by incorporating the elastic abrasive manufacturing method and device, enable blasting to be performed continuously for a prolonged period of time while maintaining a constant treatment state.

SUMMARY OF THE INVENTION

The following description of means for solving the problem is appended with reference signs employed in embodiments for implementing the invention. These reference signs are employed to clarify correspondence between the recitation of the scope of patent claims and the description of embodiments for implementing the invention, and obviously do not limit the interpretation of the technological scope of the present invention.

In order to achieve the object, the present invention relates to the method and device for manufacturing an elastic abrasive. In the device for manufacturing an elastic abrasive 70 having a structure in which abrasive grains 72 have been combined to a surface of cores 71 that are formed from an elastic material and at least the surface has adhesive properties, the elastic abrasive manufacturing device comprises:

a mixer 11 configured to mix the cores 71 and the abrasive grains 72 together and to adhere the abrasive grains 72 to the surface of the cores 71; and a combining unit 12 for executing a combining step in which the abrasive grains 72 are pressed against and combined to the surface of the cores 71 by passing the cores 71 that have completed the mixing process through a constricted flow path 121, 121' having a gradually narrowing flow path cross-sectional area with the cores 71 in an aggregated state so as to compress aggregate bodies of the cores 71.

The combining process may be executed by forming the constricted flow paths 121, 121' between two pressing faces 124, 124 made of two surfaces of walls arranged such that a spacing therebetween gradually narrows on progression from a wide separation section 125 to a narrow separation section 126, and passing the cores 71 that have completed the mixing process along the constricted flow paths 121, 121' from the wide separation section 125 toward the narrow separation section 126 (FIGS. 4 and 6).

At least one of the pressing faces 124, 124 may be formed by an outer peripheral face of a cylindrical roller 123 (an outer peripheral face of portions with oblique lines in FIG. 6), and the combining process is executed by rotating the roller 123 so that the pressing face 124 formed by the outer peripheral face of the roller 123 moves along the constricted flow path 121 from the wide separation section 125 toward the narrow separation section 126 (See FIG. 6).

Moreover, a plurality of the constricted flow paths 121, 121' may be arranged in series, and after passing the cores 71 that have completed the mixing process by the mixer 11 through one constricted flow path 121 provided upstream, the cores 71 may also be passed through another constricted flow path 121' provided downstream of the one constricted flow path 121, so that pressing of the abrasive grains 72 against the surface of the cores 71 in the combining process is performed a plurality of times corresponding to the number of the constricted flow paths 121, 121' formed (FIG. 6C).

In such case, a flow path cross-sectional area d2 of a narrow separation section 126 of the other constricted flow path 121' may be narrower than a flow path cross-sectional area d1 of a narrow separation section 126 of the one constricted flow path 121, and a pressing force of the abrasive grains 72 against the surface of the cores 71 in the combining process may be progressively raised in stages (See FIG. 6C).

In a blasting method of the present invention and a blasting device 1 to execute the method comprises:

a blasting chamber 8 where ejection of an abrasive is performed;

an abrasive recovery section 20 in communication with a bottom section of the blasting chamber 8; and an abrasive ejection means 30 for ejecting abrasive from in the abrasive recovery section 20 into the blasting chamber 8, with an abrasive re-circulation system being formed to re-circulate the abrasive from the blasting chamber 8, through the abrasive recovery section 20, to the abrasive ejection means 30, and an elastic abrasive 70 employed as the abrasive having a structure in which abrasive grains 72 have been adhered to a surface of cores 71 that are formed from an elastic material and have adhesive properties at least at the core surface; and the blasting device 1 including an elastic abrasive regeneration device 10 in which at least some of recovered abrasive 70' recovered in the abrasive recovery section 20 is regenerated and returned into the abrasive re-circulation system, the regeneration device 10 including a mixer 11 configured to mix the recovered abrasive 70' and the abrasive grains 72 together and to adhere the abrasive grains 72 to the surface of the cores 71 of the recovered abrasive 70'; and a combining unit 12 for executing a combining process in which the abrasive grains 72 are pressed against and combined to the surface of the cores 71 of the recovered abrasive 70' by passing the cores 71 that have completed the mixing process through a constricted flow path 121 having a gradually narrowing flow path cross-sectional area with the cores 71 in an aggregated state so as to compress aggregate bodies of the cores 71.

In the blasting device 1, the combining process may be executed by forming the constricted flow path 121 between two pressing faces 124, 124 which are made of the two surfaces of walls arranged such that a spacing therebetween gradually narrows on progression from a wide separation section 125 to a narrow separation section 126, and passing the recovered abrasive 70' that has completed the mixing process by the mixer 11 along the constricted flow path 121 from the wide separation section 125 toward the narrow separation section 126 (See FIGS. 4 to 6).

At least one of the pressing faces 124, 124 may be formed by an outer peripheral face of a cylindrical roller 123 (an outer peripheral face of portions with oblique lines in FIG. 6), and in such case, the combining process is executed by rotating the roller 123 so that the pressing face 124 formed by the outer peripheral face of the roller 123 moves along the constricted flow path 121 from the wide separation section 125 toward the narrow separation section 126 (See FIG. 6).

Furthermore, a plurality of the constricted flow paths 121, 121' may be arranged in series, and after the recovered abrasive 70' that has completed the mixing process has been passed along one constricted flow path 121 provided upstream, the recovered abrasive 70' may be also passed along another constricted flow path 121' provided downstream of the one constricted flow path 121, so that pressing of the abrasive grains 72 against the surface of the cores 71 in the combining process may be performed a plurality of times corresponding to the number of the constricted flow paths 121, 121' formed (See FIG. 6C).

In such case, it is preferable that a flow path cross-sectional area d2 of a narrow separation section 126 of the other constricted flow path 121' is narrower than a flow path cross-sectional area d1 of a narrow separation section 126 of the one constricted flow path 121, and a pressing force of the abrasive grains 72 against the surface of the cores 71 in the combining process is progressively raised in stages (See FIG. 6C).

Due to adopting the configuration of the present invention as described above, the elastic abrasive manufacturing method and the elastic abrasive manufacturing device of the present invention use the mixer 11 to mix the cores 71 (or the recovered abrasive 70') and the abrasive grains 72 together, and to adhere the abrasive grains to the surface of the cores 71 (the recovered abrasive 70'), and then pass the cores 71 (recovered abrasive 70') that have been mixed by the mixer along the constricted flow paths 121, 121' having a gradually narrowing flow path cross-sectional area while in an aggregated state of the cores 71 (recovered abrasive 70'). This enables the abrasive grains 72 to be pressed with a comparatively strong pressing force against the surface of the cores 71 by aggregate bodies of the cores 71 (the recovered abrasive 70') being compressed as the flow path cross-sectional area decreases. As a result the abrasive grains 72 that have been adhered by mixing with the mixer 11 can be caused to combine to the surface of the cores 71 at high density and high strength.

Moreover, the pressing force of the abrasive grains 72 against the surface of the cores 71 can be easily adjusted by changing the compression ratio on the aggregate bodies of the cores 71 (the recovered abrasive 70'), such as by changing the flow path cross-sectional area d of the narrow separation section 126. The pressing force of the abrasive grains 72 against the surface of the cores 71 is according easily changed to the most appropriate according to the physical properties of the cores 71 and the abrasive grains 72, environmental conditions, and the like.

In a configuration in which the constricted flow path 121, 121' is provided between the pressing faces 124, 124 formed by two surfaces of walls, the pressing force of the abrasive grains 72 against the surface of the cores 71 can be more easily changed according to the physical properties of the cores 71 and the abrasive grains 72, the environmental conditions, or the like by changing an inclination angle of these pressing faces 124, 124, or by adjusting the separation between the pressing faces 124, 124.

In a configuration in which at least one of the pressing faces 124, 124 is formed by an outer peripheral face of a cylindrical roller 123, not only can the pressing force be easily changed by changing the flow path cross-sectional area d of the narrow separation section 126 by adjusting a separation between the rollers 123, 123, but the time to pass along the constricted flow path 121, and hence the application time of pressing force, can be adjusted by adjusting the rotation speed of the roller 123, and accordingly finer adjustments can be made to the pressing conditions of the abrasive grains 72 against the surface of the cores 71.

Moreover, in such a configuration in which at least one of the pressing faces 124, 124 is formed by an outer peripheral face of a cylindrical roller 123, the cores 71 (the recovered abrasive 70') can be forcibly moved by rotation of the roller 123 and pushed out from the constricted flow path 121, 121'. This means that even in cases in which the flow path cross-sectional area d, d1, d2 of the narrow separation section 126 is small and compression is performed at a high compression ratio, clogging of the cores 71 (the recovered abrasive 70') inside the constricted flow path 121 can be prevented from arising. As a result, this enables the abrasive grains 72 to be pressed against the surface of the cores 71 with a higher pressing force, enabling the range of selectable pressing forces to be expanded.

Furthermore, the abrasive grains 72 can be pressed against the surface of the cores 71 plural times in a configuration in which plural constricted flow paths 121, 121' are arranged in series, and after the cores 71 (the recovered abrasive 70') that have completed the mixing process are passed through one constricted flow path 121 provided upstream, they are then also passed through another constricted flow path 121' provided downstream of the one constricted flow path 121. This enables the abrasive grains 72 to be combined at an even higher density and higher strength.

In particular, in a configuration in which a flow path cross-sectional area d2 of a narrow separation section 126 of the downstream constricted flow path 121' is narrower than a flow path cross-sectional area d1 of the narrow separation section 126 of the upstream constricted flow path 121, the pressing force of the abrasive grains 72 against the surface of the cores 71 can be progressively raised in stages, enabling the combination of the abrasive grains 72 to the surface of the cores 71 to be performed more uniformly and with a higher combining strength.

The elastic abrasive manufacturing device of the present invention configured as described above, enables provision of the blasting device 1 capable of performing blasting continuously for a prolonged period of time while maintaining a constant treatment precision without replacing the elastic abrasive 70. This is achieved in the re-circulatory blasting device 1 incorporating the elastic abrasive regeneration device 10 by subjecting at least some of the used recovered abrasive 70' to regeneration, and by returning the abrasive into the re-circulation system after being regenerated by adhering and combining abrasive grains to the surface of the cores 71 of the recovered abrasive 70'.

BRIEF DESCRIPTION OF THE DRAWINGS

The objects and advantages of the invention will become understood from the following detailed description of preferred embodiments thereof in connection with the accompanying drawings in which like numerals designate like elements, and in which:

FIG. 2 is an explanatory diagram of an elastic abrasive regeneration (manufacturing) device.

FIG. 3 is a schematic cross-section of a mixer.

FIG. 6A is of an example in which a constricted flow path is formed between a flat plate and an outer peripheral face of a roller, FIG. 6B is of an example in which a constricted flow path is formed between outer peripheral faces of a pair of rollers, and FIG. 6C is of an example in which constricted flow paths are formed between outer peripheral faces of two respective pairs of rollers disposed above and below each other.

FIG. 8A is a cross-section viewed from the front, and FIG. 8B is a cross-section taken along line B-B of FIG. 8A.

DETAILED DESCRIPTION OF THE PREFERRED EMBODIMENTS

Description follows regarding an exemplary embodiment of the present invention, with reference to the appended drawings.

Note that in the exemplary embodiment described below, although a description will be given of an elastic abrasive manufacturing device of the present invention for a configuration incorporated as an elastic abrasive regeneration device in a re-circulatory type blasting device, the elastic abrasive manufacturing device of the present invention may be employed in isolation to manufacture elastic abrasive without being incorporated into a blasting device.

Elastic Abrasive to be Manufactured (Regenerated)

In the present invention, an elastic abrasive 70 to be manufactured or regenerated has a structure including elastic cores 71 having adhesive properties at least at the surface thereof, and abrasive grains 72 adhered to the surface of the cores 71. Various materials, dimensions, shapes, and the like may be employed for the elastic abrasive 70 as long as the above structure is achieved. The elastic abrasive 70 may be a structure in which abrasive grains 72 have been adhered to the surface of the cores 71 configured from a material with self-adhesive properties, such as a gelatin or elastomer, or the elastic abrasive 70 may be a structure in which the abrasive grains 72 have been adhered to the surface of the cores 71 whose surface has been imparted with adhesive properties by coating the surface of a resin such as polyurethane with a material having self-adhesive properties.

Moreover, various types of abrasive grain may be used as the abrasive grains 72 employed, and examples employable therefor include diamond, cBN, silicon carbide, alumina, zircon, high speed steels, carbon steel alloys, glass, resins, copper and alloys of copper, aluminum and alloys of aluminum, and the like. Such abrasive grains may be employed singly, or in a combination of plural types thereof. With regard to the particle diameter of the abrasive grains, various particle diameters are selectable according to the application in which the elastic abrasive obtained therefrom is to be employed, and an example of a selectable range is a median diameter D50 of from 0.05 μm to 1 mm With regard to the shape of the abrasive grains, various shapes are selectable, such as irregular, angular, spherical, and columnar shaped abrasive grains.

Blasting Device Overall Structure

Figure 1A:
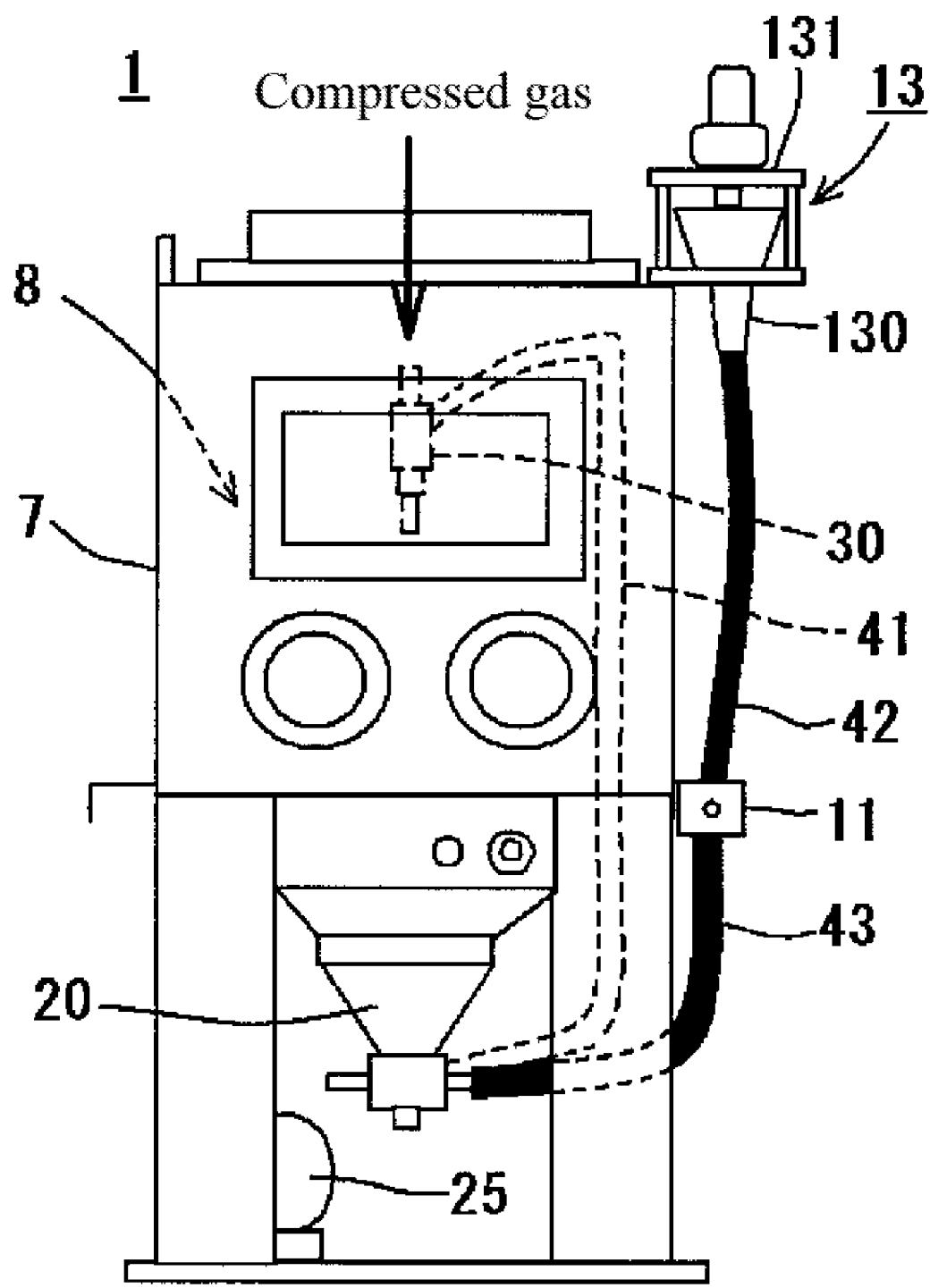
FIG. 1A is a front view of a blasting device of the present invention.
Figure 1B:
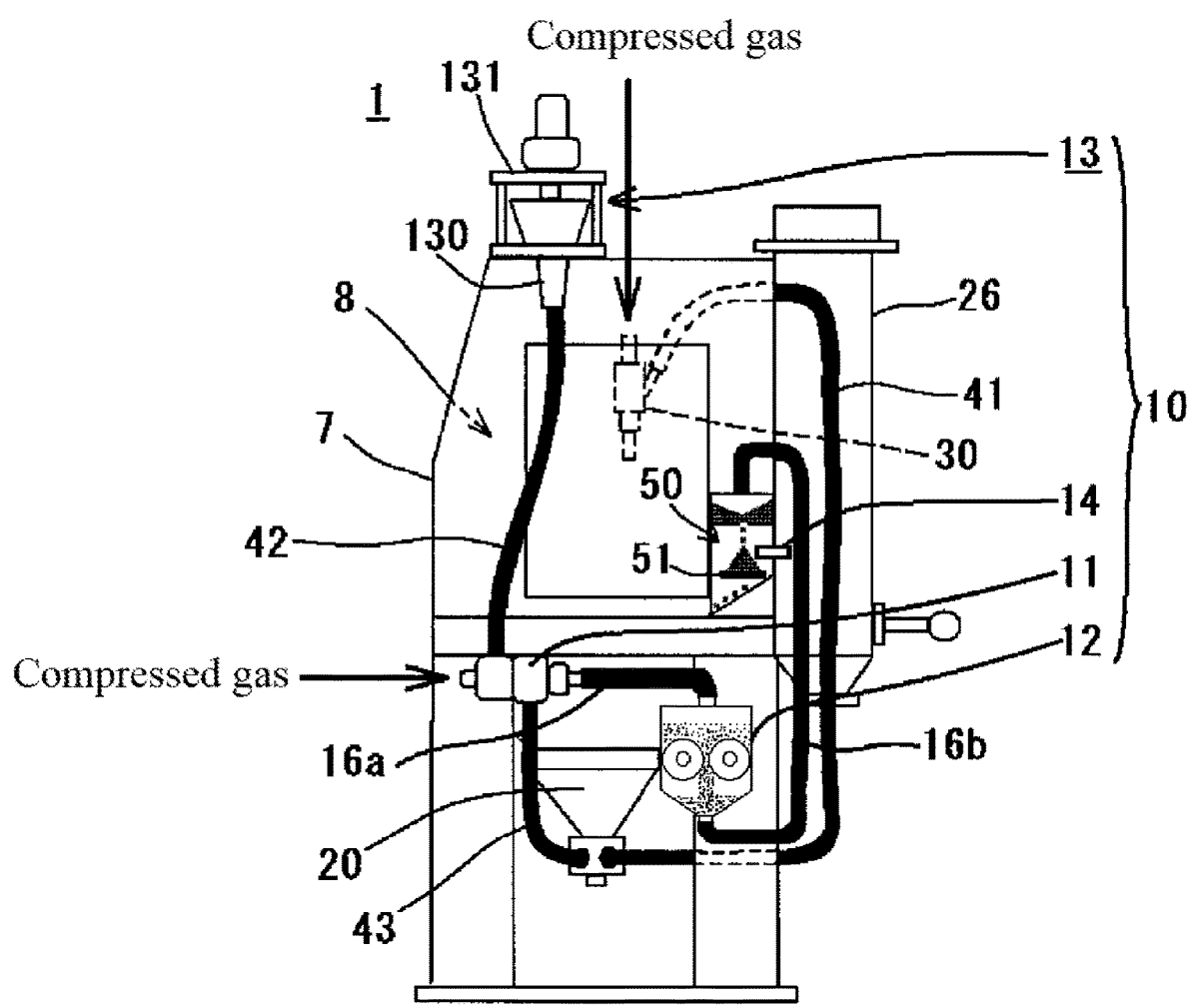
FIG. 1B is a side view thereof.

FIG. 1A and FIG. 1B illustrate an example of a configuration of a blasting device of the present invention equipped with an elastic abrasive regeneration device 10, described later.

A blasting device 1 illustrated in FIG. 1 is a re-circulatory type blasting device equipped with a blasting chamber 8 in which abrasive ejection is performed formed inside a cabinet 7, an abrasive recovery section 20 in communication with a bottom section of the blasting chamber 8 and serving as a recovery hopper for recovering the abrasive, and an abrasive ejection means 30 for ejecting abrasive from inside the abrasive recovery section 20 into the blasting chamber 8. An abrasive re-circulation system is formed from the blasting chamber 8, through the abrasive recovery section 20 and an abrasive feed pipe 41, to the abrasive ejection means 30, in a configuration such that the abrasive ejected by the abrasive ejection means 30 is re-circulated through the system, so as to enable the abrasive to be re-ejected by the abrasive ejection means 30.

A blast gun is provided in the illustrated exemplary embodiment as the abrasive ejection means 30 to eject the abrasive in the blasting chamber 8, with the blast gun ejecting abrasive carried by a compressed gas from a non-illustrated compressed gas supply. However, there is no limitation to such pneumatic abrasive ejection, and various known types of abrasive ejection means may be employed as the abrasive ejection means 30 that do not use acceleration by compressed gas to enable dry abrasive to be ejected or projected (these are collectively referred to as "ejected" in the present invention), such as an impact type that causes abrasive grains to impact and be struck out by a rotating impeller, a centrifugal type in which abrasive is ejected by centrifugal force, or the like.

A bottom section of the blasting chamber 8 where abrasive ejection is performed using the abrasive ejection means 30 is configured in a hopper shape formed by a funnel shape, in a configuration such that the abrasive ejected in the blasting chamber 8 falls into the abrasive recovery section 20 formed by this hopper shape.

A baffle (not illustrated in the drawings) for classifying into elastic abrasive and dust is provided inside the blasting chamber 8, and the elastic abrasive classified by the baffle is recovered in the abrasive recovery section 20, and the dust floating around inside the blasting chamber 8 is fed by an extractor fan (blower) 25 into a dust collector 26 provided on the back face of the cabinet 7 where it is collected.

The abrasive feed pipe 41 is communicated with a bottom section of the abrasive recovery section 20 where the elastic abrasive is recovered. The abrasive feed pipe 41 is also communicated with the abrasive ejection means 30, served by the suction type blast gun in the illustrated example.

Note that although an example has been described of a configuration in which classification into elastic abrasive and dust is performed in the present exemplary embodiment by the baffle referred to above, instead of such a configuration, the abrasive recovery section 20 may, for example, be configured by a cyclone type abrasive tank or the like capable of classifying elastic abrasive and the dust.

Compressed air is fed into the blast gun 30 from the non-illustrated compressed air supply, and abrasive inside the abrasive recovery section 20 is sucked through the abrasive feed pipe 41 by a negative pressure generated inside the blast gun 30 by the compressed air being fed into the blast gun 30 from the compressed air supply, so as to enable the abrasive to be ejected together with the compressed air into the blasting chamber 8.

In this manner, in the illustrated re-circulatory type of blasting device 1, the abrasive ejected by the abrasive ejection means 30 is fed back into the abrasive ejection means 30 through the blasting chamber 8 and the abrasive recovery section 20, and then re-ejected. Forming such an abrasive re-circulation system achieves a configuration in which blasting can be performed continuously for a prolonged period of time using re-circulation of abrasive.

Elastic Abrasive Regeneration Device

Figure 10:
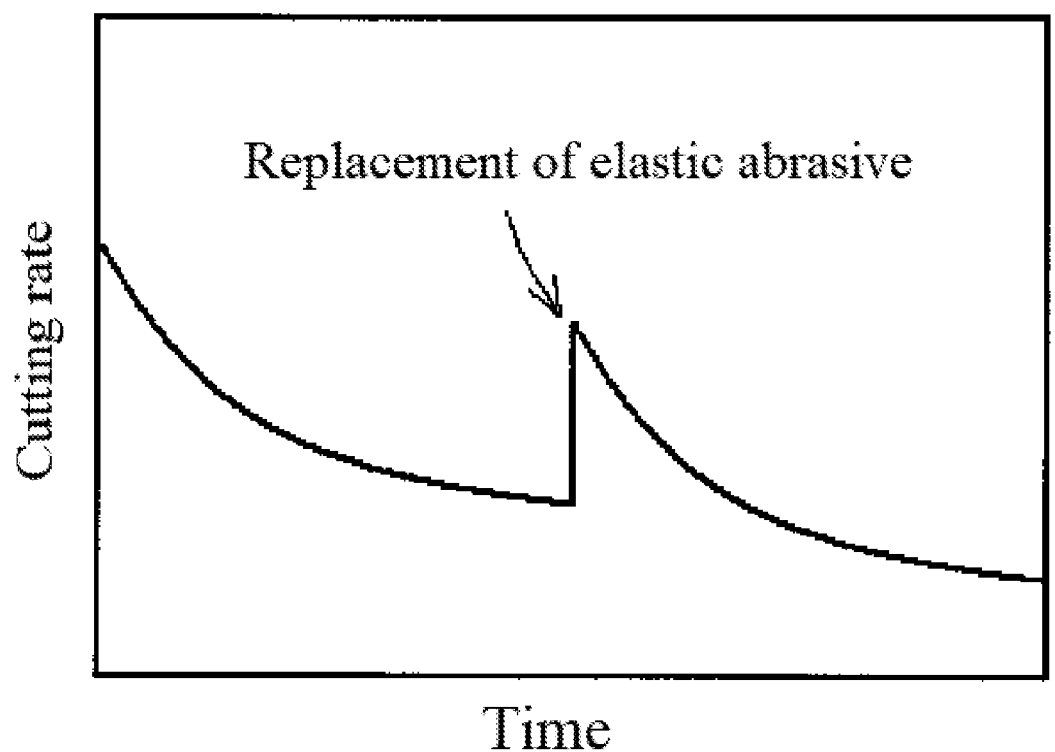
FIG. 10 is an explanatory diagram illustrating a relationship between ejection time and cutting rate for conventional blasting employing an elastic abrasive.

The re-circulatory type blasting device 1 configured as described above enables blasting to be performed continuously for a prolonged period of time by re-circulating and re-using abrasive. However, when the elastic abrasive 70 having a structure in which abrasive grains have been adhered to the surface of the cores 71 is employed as the abrasive, the abrasive grains 72 adhered to the surface of the cores 71 are fallen off by impact with a workpiece, resulting in a gradual decrease in the cutting performance as the elastic abrasive 70 is repeatedly re-circulated and re-used. The state of treatment to the workpiece accordingly changes (see FIG. 10) even when other treatment conditions, such as the ejection pressure and ejection velocity, are held constant.

Thus in the blasting device 1 of the present invention, providing the elastic abrasive regeneration device 10 to regenerate at least some of the elastic abrasive for re-circulation inside the abrasive re-circulation system, enables continuous blasting for a prolonged period of time without causing changes to the treatment state with the passage of time.

FIG. 1B and FIG. 2 illustrate the elastic abrasive regeneration device 10. The elastic abrasive regeneration device 10 at least includes: a mixer 11 to mix recovered abrasive 70' and abrasive grains together, and to adhere abrasive grains to the surface of the cores 71 of the recovered abrasive 70' where the surface has been exposed by abrasive grains being fallen off; and a combining unit 12 that presses abrasive grains newly adhered to the surface of the cores 71, by mixing using the mixer 11, against the surface of the cores 71 and combines the newly adhered abrasive grains thereto. In the illustrated exemplary embodiment, the mixer 11 and the combining unit 12 are provided on a flow path separate to the abrasive re-circulation system.

Moreover, the illustrated exemplary embodiment includes an abrasive grain feeder 13 for feeding abrasive grains into the mixer 11 and provided with an abrasive grain metering means 131 (see FIG. 1B) capable of varying the quantity of abrasive grains fed into the mixer 11, includes a detection means 14 to measure the adhered amount of abrasive grains to the surface of the cores 71 of the regenerated elastic abrasive 70 regenerated by combining in the combining unit 12, and includes a control means 15 that uses received feedback measurement results from the detection means 14 to control the abrasive grain metering means 131 to change the quantity of abrasive grains being fed so that the measured adhered amount of abrasive grains approaches a pre-set target adhered amount.

Mixer

The mixer 11 mixes the recovered abrasive 70' to be regenerated together with abrasive grains to be adhered to the surface of the cores 71 of the recovered abrasive 70', and adheres abrasive grains 72 to the surface of the cores 71 of the recovered abrasive 70' exposed by the abrasive grains 72 being fallen off.

In the present exemplary embodiment, a solid-gas two-phase flow is generated by merging the recovered abrasive 70' and the abrasive grains 72 together with a common gas flow. By mixing the recovered abrasive 70' and the abrasive grains 72 together in the solid-gas two-phase flow, new abrasive grains 72 are adhered to the surface of the cores 71 of the recovered abrasive 70' where the surface had been exposed by the abrasive grains being fallen off by the adhesive force processed by the cores 71. By the mixing performed in the gas flow as described above, the abrasive grains 72 are adhered to portions where the abrasive grains 72 had been fallen off while preventing particles of the recovered abrasive 70' from combining and clumping together.

An example of the mixer 11 to mix the recovered abrasive 70' and the abrasive grains 72 together in the gas flow in the manner described above is illustrated in FIG. 3.

The mixer 11 illustrated in FIG. 3 is a configuration including a first body 111 having with an abrasive grain intake chamber 112 formed inside and a second body 113 formed with a recovered abrasive intake chamber 114 inside that are connected together through an intermediate housing 115, a first air jet 116 in communication with a rear end of a non-illustrated compressed gas supply and having a leading end of the first air jet 116 inserted into the abrasive grain intake chamber 112 of the first body 111, with the leading end of the first air jet 116 also facing toward the rear end of a second air jet 117, wherein the leading end of the second air jet 117 is inserted into the recovered abrasive intake chamber 114 and faces toward an outlet 118 of the mixer 11.

An intake port 112a of the abrasive grain intake chamber 112 is in communication with the abrasive grain feeder 13 through an abrasive grain feed pipe 42 (see FIG. 2), and an intake port 114a of the recovered abrasive intake chamber 114 is in communication with the bottom section of the abrasive recovery section 20 through a recovered abrasive feed pipe 43 (see FIG. 2).

Note that in the illustrated example, each of the components of the configuration of the mixer as described above are formed separately, and the mixer 11 is formed by their combination. However, instead of such a configuration, for example, the mixer 11 may be integrally manufactured, i.e. not from separate components, by using a metal 3D printer that uses a laser fusion method, an electron beam fusion method, or the like.

Manufacture using a 3D printer in this manner is beneficial from the perspective of manufacturing speed and cost compared to manufacturing by a machine processing cutting method or the like, and is also beneficial from the cost perspective when producing in large volumes.

Examples of the metal employed to manufacture such a mixer 11 include a maraging steel, a titanium alloy, a stainless steel alloy, a cobalt-chromium alloy, a nickel alloy, an Inconel (registered trademark), or another metal or alloy.

In the mixer 11 equipped with the above configuration, when a compressed gas is fed from the compressed gas supply to the first air jet 116 and ejected from the leading end of the first air jet 116 toward the rear end of the second air jet 117, a negative pressure develops inside the abrasive grain intake chamber 112 due to compressed gas ejection, abrasive grains 72 from the abrasive grain feeder 13 are accordingly sucked into the abrasive grain intake chamber 112, and are merged with the compressed gas being ejected from the leading end of the first air jet 116 before being fed into the second air jet 117.

The mixed flow of the abrasive grains 72 and the gas flow fed into the second air jet 117 is ejected into the recovered abrasive intake chamber 114 in the direction toward the outlet 118 of the mixer 11. A negative pressure accordingly develops inside the recovered abrasive intake chamber 114, and some of the recovered elastic abrasive inside the abrasive recovery section 20 is accordingly fed into the recovered abrasive intake chamber 114 as recovered abrasive 70' to be regenerated. This merges with the gas flow containing abrasive grains, and results in a solid-gas two-phase flow being ejected from the mixer 11.

In this manner, the abrasive grains 72 and the recovered abrasive 70' are caused to merge together with the gas flow to generate the solid-gas two-phase flow, the abrasive grains 72 and the recovered abrasive 70' in the solid-gas two-phase flow are mixed together without clumping or the like, and new abrasive grains 72 are adhered to the surface of the cores 71 of the recovered abrasive 70' where the surface had been exposed by the abrasive grains 72 being fallen off.

The quantity of elastic abrasive fed as the recovered abrasive 70' from the abrasive recovery section 20 into the mixer 11 in a specific period of time (g/minute) is preferably adjusted to be from 5% to 50% of the quantity of the elastic abrasive being ejected into the blasting chamber in a specific period of time (g/minute), and is more preferably adjusted so as to be from 10% to 30% thereof.

Moreover, the feed rate of abrasive grains fed into the mixer 11 is preferably not more than 3.0% of the feed rate of recovered abrasive, and is more preferably not more than 1.0% thereof.

In cases in which more than 3.0% of the abrasive grains 72 is fed then this results in more abrasive grains 72 being fed in than a quantity that would cover the entire surface of the recovered abrasive 70', and in the generation of lots of free abrasive grains that are not able to be adhered to the surface of the recovered abrasive 70'. Such free abrasive grains are returned in the abrasive re-circulation system together with the regenerated elastic abrasive 70 and ejected against the workpiece. As well as this causing the treatment state to deteriorate, such as by forming a matt finish or the like on the surface of a workpiece, these free abrasive grains are also subsequently recovered inside the dust collector 26 by air sorting in the abrasive recovery section 20 and discarded, resulting in the cost of the blasting increasing and having a significant negative economic impact, particularly when expensive abrasive grains such as diamond, silicon carbide, cBN or the like are employed.

Note that although in the illustrated example the space inside the first body 111 is configured by the abrasive grain intake chamber 112, and the space inside the second body 113 is configured by the recovered abrasive intake chamber 114, a reverse configuration may be adopted in which the space inside the first body 111 is formed as a recovered abrasive intake chamber in communication with the abrasive recovery section 20, and the space inside the second body 113 is formed as an abrasive grain intake chamber 112 in communication with the abrasive grain feeder 13. There is no limitation to the illustrated configuration, as long as the gas flow containing the abrasive grains 72 and the gas flow containing the recovered abrasive 70' are merged and mixed together, and as long as the abrasive grains can be adhered to the surface of the recovered abrasive 70'. Various modifications are accordingly possible thereto.

Moreover, although in the illustrated example, a configuration has been described in which mixing of the abrasive grains 72 with the recovered abrasive 70' is performed in the gas flow, as long as both can be mixed together and the abrasive grains can be caused to adhere to the surface of the cores 71 of the recovered abrasive 70', the configuration of the mixer 11 is not limited to the illustrated configuration.

Combining Unit

For the recovered abrasive 70' that has passed through the mixer 11 as described above, new abrasive grains 72 are adhered to the surface of the cores 71 by the mixing in the mixer 11. However, the adhering of such abrasive grains 72 is merely adhering to the surface by the adhesive force processed by the cores 71 of the abrasive grains 72, and the state of combination between the cores 71 and the abrasive grains 72 may still be a weak state.

This means that the recovered abrasive 70' is not able to be re-employed as the elastic abrasive 70 when still in such a state. In order to achieve a state capable of withstanding reuse, the abrasive grains 72 need to be pressed against the surface of the cores 71 of the recovered abrasive 70', and to be caused to combine strongly therewith by part of the abrasive grains 72 being embedded into the cores 71.

In order to enable the cores 71 and the abrasive grains 72 to combine strongly together in this manner, the recovered abrasive 70' after being mixed by the mixer 11 is fed into the combining unit 12 equipped with a constricted flow path 121 that gradually narrows in flow path cross-sectional area, and the abrasive grains 72 are pressed against the surface of the cores 71 by aggregate bodies of the recovered abrasive 70' being compressed while they are being passed through the constricted flow path 121 in an aggregated state.

Figure 4A:
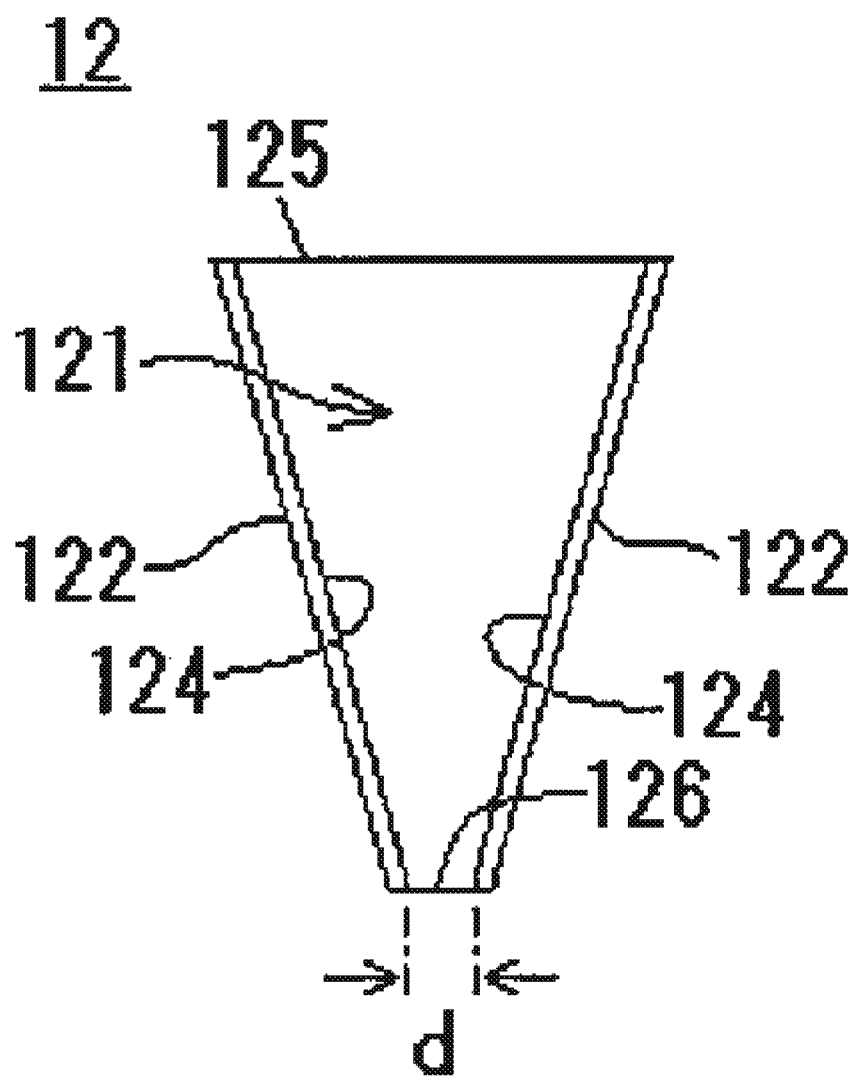
FIG. 4A and FIG. 4B are each explanatory diagrams of a combining unit having a structure in which a constricted flow path is formed between two flat plates, with FIG. 4A illustrating a structure in which both flat plates are inclined, and FIG. 4B illustrating a structure in which one of the flat plates is inclined.
Figure 4B:
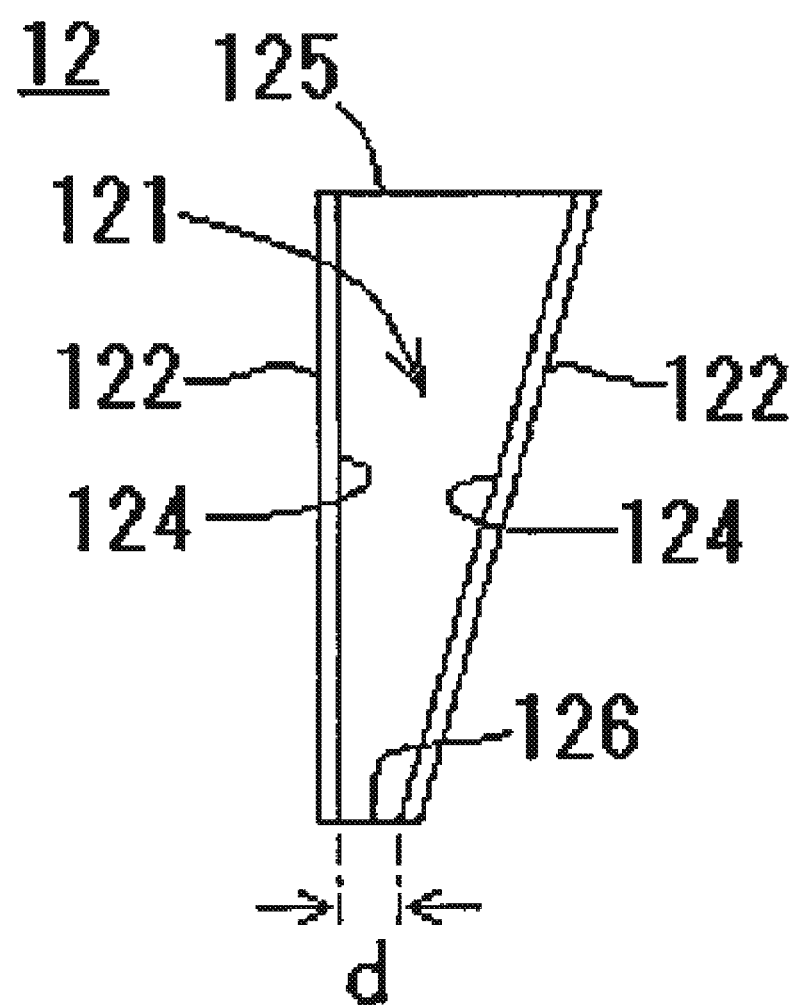
Figure 5:
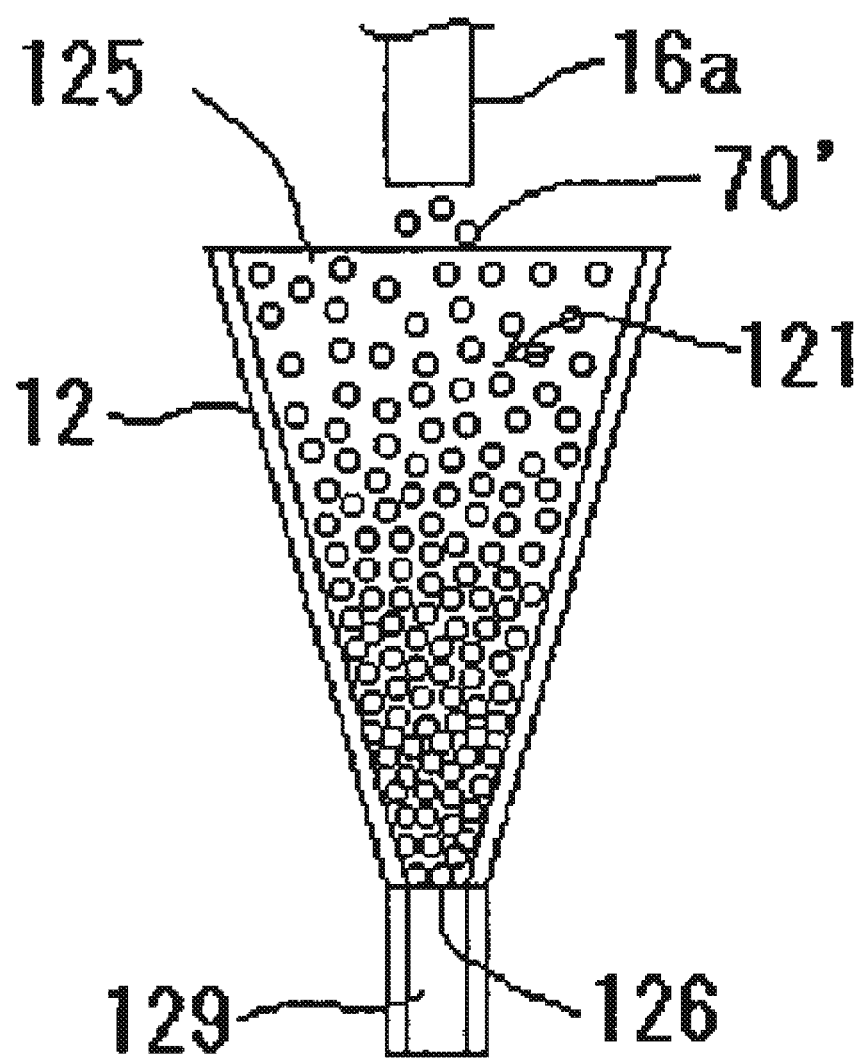
FIG. 5 is an explanatory diagram to explain a compressed state of recovered abrasive in the combining unit of FIG. 4A.

Examples of configurations of the combining unit 12 equipped with such a constricted flow path 121 are illustrated in FIG. 4 to FIG. 6.

In FIG. 4 thereof, the constricted flow path 121 is formed between two flat plates 122, 122, and pressing faces 124, 124 are formed by the surface of walls defining the constricted flow path 121 configured by the respective surfaces of the flat plates 122, 122. The two flat plates 122, 122 are arranged with a specific angle formed therebetween such that the separation between the pressing faces 124, 124 is a separation that gradually narrows on progression from a wide separation section 125 to a narrow separation section 126. The constricted flow path 121 is accordingly formed with a width that narrows toward the bottom of the page.

The flow path cross-sectional area and the like of this constricted flow path 121 is adjusted so that the recovered abrasive 70', which is being fed from the mixer 11 as the solid-gas two-phase flow through a pipeline 16a as illustrated in FIG. 5, passes through the constricted flow path 121 in an aggregate state in which particles of recovered abrasive 70' are contacting each other. Aggregate bodies of recovered abrasive 70' are thereby compressed as they move in the constricted flow path 121 from the wide separation section 125 to the narrow separation section 126, and the density thereof rises. The particles of the recovered abrasive 70' therefore pass through the narrow separation section 126 in a state compressed against each other, and the abrasive grains 72 that are adhered to the surface of the cores 71 are pressed toward the center of the cores 71, resulting in at least part of the abrasive grains 72 becoming embedded in the cores 71 so as to achieve strong combination therewith.

In this manner, in the example in which the constricted flow path 121 is formed between the two flat plates 122, 122, the compressed state of the recovered abrasive 70' passing through the constricted flow path 121, and hence the pressing force of the abrasive grains 72 against the surface of the cores 71, can be changed by changing the angle formed by the two flat plates 122, 122 and/or by modifying the flow path cross-sectional area d of the narrow separation section 126. The abrasive grains 72 can accordingly be pressed against the surface of the cores 71 by the most appropriate pressing force by adjusting the above compressed state of the recovered abrasive 70' and the pressing force of the abrasive grains 72 against the surface of the cores 71 according to the physical properties of the cores 71 and the abrasive grains 72 of the recovered abrasive 70', the environmental conditions, and the like.

Note that in the thus configured combining unit 12, a straight flow path 129 connected to the constricted flow path 121, and having a flow path cross-sectional area d of the narrow separation section 126 and a specific length, may be provided as illustrated in FIG. 5, such that the aggregate bodies of the recovered abrasive 70' are retained in a specific compressed state for a specific period of time before they pass out of the straight flow path 129.

Moreover, in cases in which the constricted flow path 121 is formed in this manner by flat plates 122, 122, a vibration may be imparted to the flat plates 122, 122. This causes the particles of the recovered abrasive 70' to make even closer contact with each other, raising the pressing force of the abrasive grains against the surface of the cores 71, and also enabling the recovered abrasive 70' to be prevented from clogging inside the constricted flow path 121.

The combining unit 12 described with reference to FIG. 4 is an example of a configuration in which the pressing faces 124, 124 respectively formed by the walls defining the constricted flow path 121 are formed by the surfaces of the flat plates 122, 122, however, one or both of the pressing faces 124, 124 defining the constricted flow path 121 may be formed by an outer peripheral face of a cylindrical roller 123.

Figure 6A:
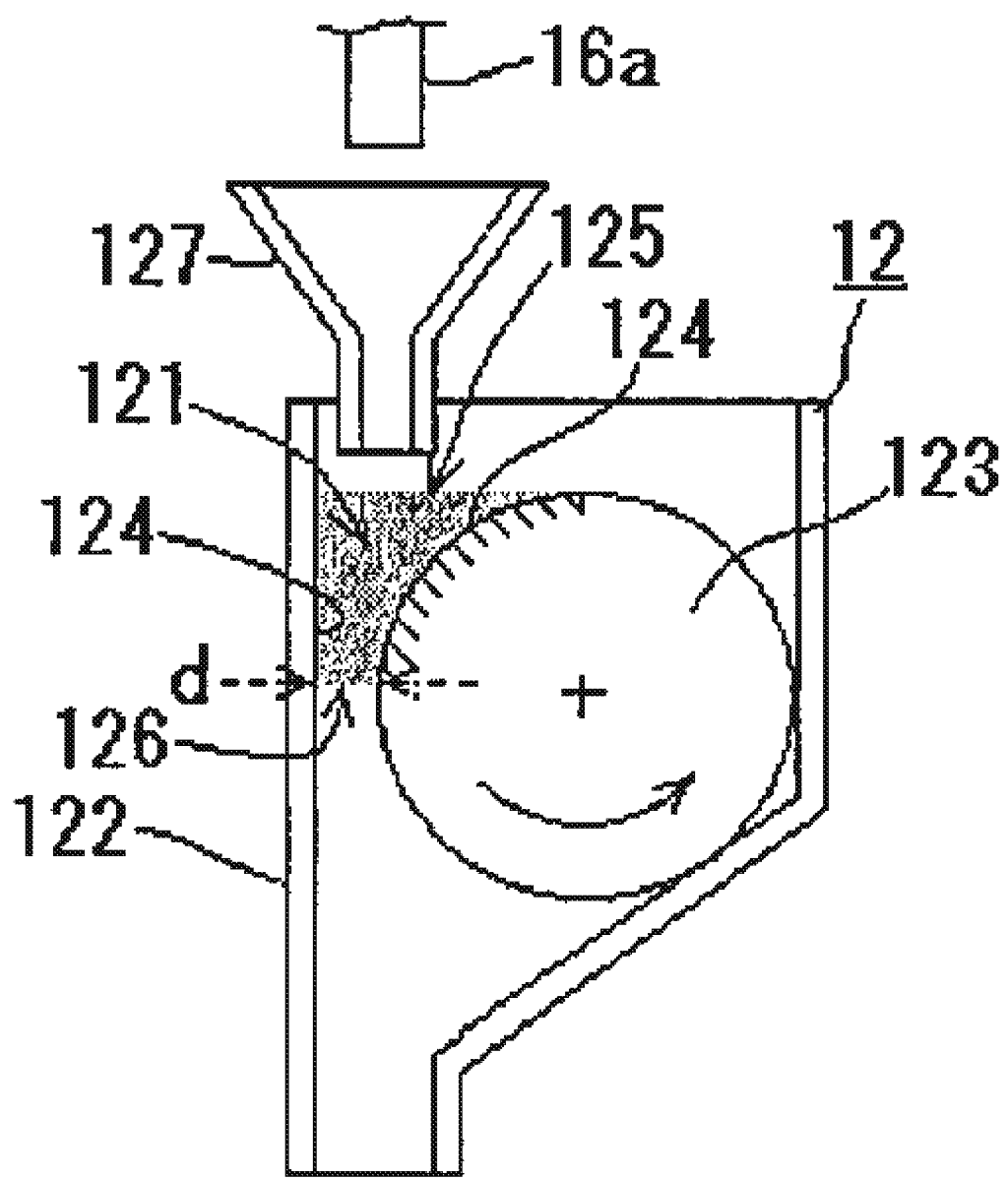
FIGS. 6A to 6C are each explanatory diagrams illustrating an example of a configuration of a roller-equipped combining unit.
Figure 6B:
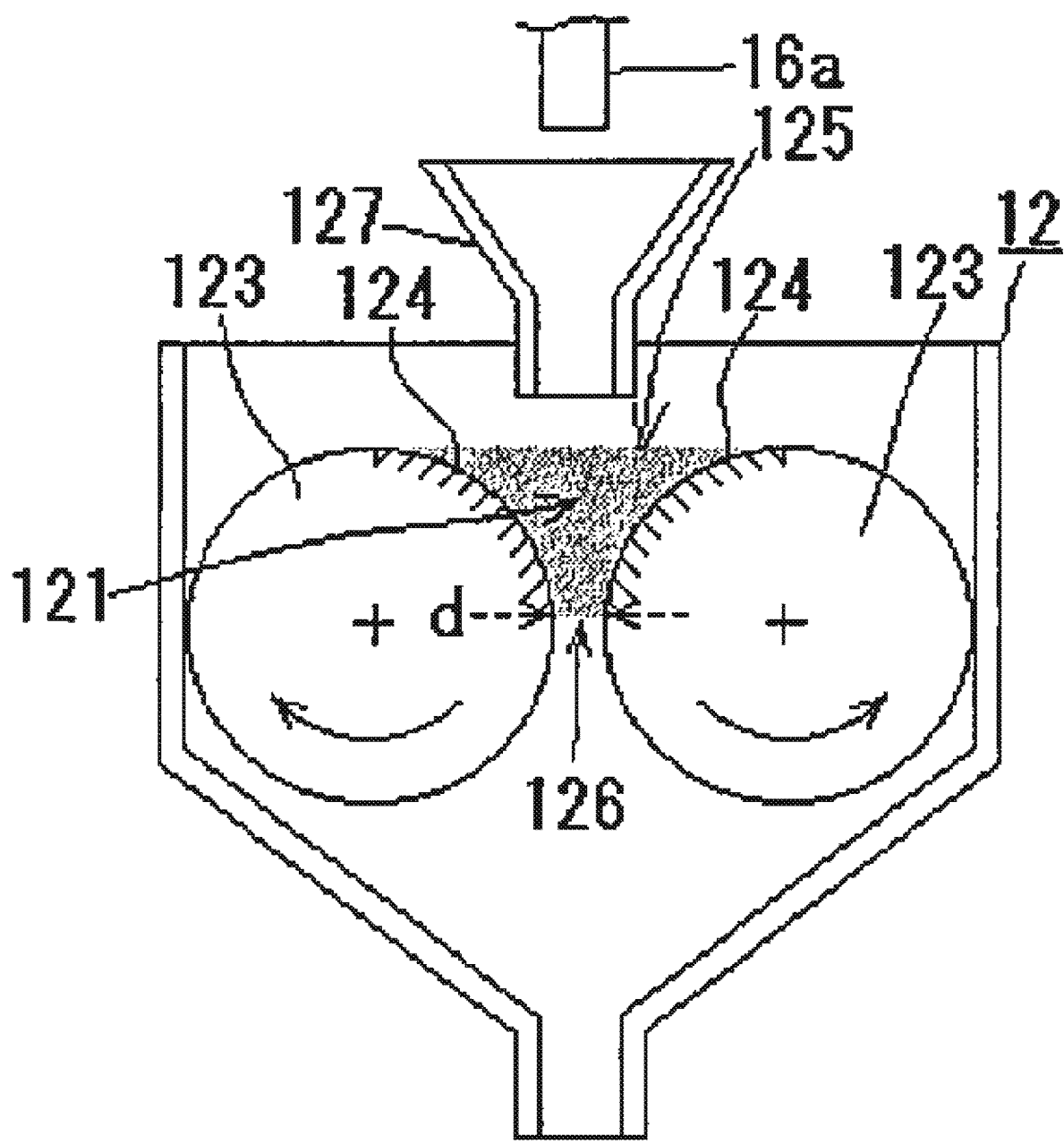
Figure 6C:
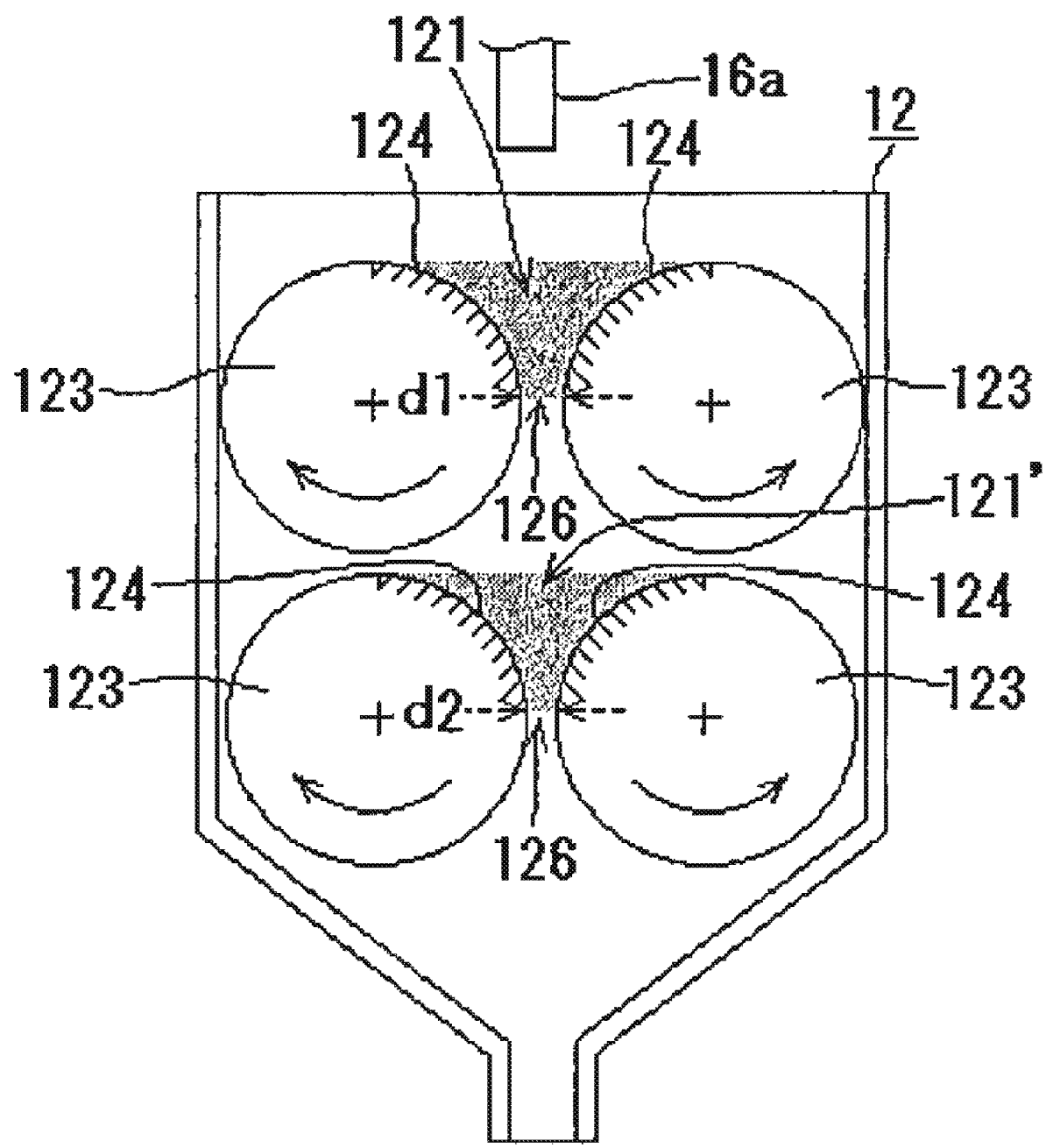

FIG. 6A illustrates an example of a constricted flow path 121, depicted in the drawing with grey infill, configured by a surface of a flat plate 122 as one of the pressing faces 124, 124 defining the constricted flow path 121, and by the outer peripheral face of a roller 123 (the outer peripheral portion thereof depicted in the drawing with diagonal shading) as the other thereof. FIG. 6B illustrates an example of a constricted flow path 121, depicted in the drawing with grey infill, in which both of the pressing faces 124, 124 defining the constricted flow path 121 are formed by respective outer peripheral faces (outer peripheral portions thereof depicted with diagonal shading in the drawing) of rollers 123, 123 arranged at a specific separation from each other. Moreover, FIG. 6C illustrates an example in which two pairs of rollers 123, 123; 123, 123 are arranged above and below each other, such that after passing through the constricted flow path 121 formed between the upper rollers 123, 123, the recovered abrasive 70' can then be fed into a constricted flow path 121' formed between the additional lower rollers 123, 123.

By adopting such a configuration in which at least one of the pressing faces 124, 124 defining the constricted flow path 121 is formed by the outer peripheral face of a roller 123, combining is performed by rotating the roller 123 in the direction of the arrow in the drawing so as to move the pressing face 124 formed by the outer peripheral face of the roller 123 along the constricted flow path 121 in the direction from the wide separation section 125 side toward the narrow separation section 126 side.

As a result, the recovered abrasive 70' fed into the constricted flow path 121 in an aggregated state is compressed by being forcibly moved along the constricted flow path 121 toward the narrow separation section 126 side by such rotation of the roller 123. This enables the abrasive grains 72 to be pressed with a strong force against the surface of the cores 71 of the recovered abrasive 70', enabling a higher combining strength of the abrasive grains 72 with the surface of the cores 71 to be achieved.

Note that the combining units 12 illustrated in FIG. 6A and FIG. 6B each adopt a configuration in which the recovered abrasive 70' from the mixer 11 is first fed into a hopper 127, and then the recovered abrasive 70' that falls out from the hopper is fed into the constricted flow path 121 provided below. However, as illustrated in FIG. 6C, a configuration may be adopted in which such a hopper 127 is omitted, and the recovered abrasive 70' that has passed through the mixer 11 is fed directly into the constricted flow path 121 formed between the rollers 123, 123.

Moreover, by providing the functionality of the constricted flow path 121, as described with reference to FIG. 4A or FIG. 4B, to a flow path formed inside the hopper 127 provided to the combining unit 12 of FIG. 6A or FIG. 6B, the recovered abrasive 70' that has passed through the mixer 11 may then be primary compressed in the hopper 127, then the recovered abrasive 70' is further compressed in the constricted flow path 121 provided below.

Note that in cases in which compression of the recovered abrasive 70' is performed plural times in this manner, a configuration provided with two stage upper and lower roller pairs 123, 123 as illustrated in FIG. 6C may be adopted, and the recovered abrasive 70' that has passed through the constricted flow path 121 formed between the upper roller pair 123, 123 is then fed into the constricted flow path 121' formed between the lower roller pair 123, 123, so as to enable the abrasive grains to be pressed against the surface of the cores 71 of the recovered abrasive 70' two times.

Furthermore, compressing of the recovered abrasive 70' is not limited to the examples illustrated, and compressing may be performed three or more times by providing three or more stages of constricted flow paths 121.

In such a multi-stage configuration of constricted flow paths 121, a configuration may be adopted in which a flow path cross-sectional area d2 of a narrow separation section 126 of a lower (downstream) constricted flow path 121' is formed smaller than a flow path cross-sectional area d1 of a narrow separation section 126 of an upper (upstream) constricted flow path 121, so as to achieve a configuration in which the compression ratio of the aggregate bodies of the recovered abrasive 70', and therefore the pressing force of the abrasive grains 72 against the surface of the cores 71 of the recovered abrasive 70', is progressively raised in stages.

Note that in cases in which one or more of the pressing faces 124 of the constricted flow path 121 is formed by the outer peripheral face of a roller 123, as illustrated in FIG. 6A to FIG. 6C, although a width of the constricted flow path at the narrow separation section 126 differs depending on the physical properties of the abrasive grains 72 and the cores 71, the particle diameter and amount of the recovered abrasive 70' to be regenerated, and the like, this width is adjusted so as to achieve optimal pressing force according to the physical properties of the core (for example, the strength of adhesiveness, hardness, or the like), the physical properties of the abrasive grains (shape and particle diameter etc.), and the like, and is for example, from about 0.1 mm to about 10 mm, and is more preferably in a range of from 0.2 mm to 5 mm.

Moreover, the materials employed for the flat plates 122 and the rollers 123 configuring the constricted flow path 121 are not particularly limited, and as long as they enable the cores 71 with abrasive grains 72 adhered to the surface thereof by the mixer 11 to pass through, various materials may be employed therefor without particular limitation. Examples thereof include resins, various single metals, alloys, structural carbon steels, tool steels, high speed steels, cemented carbides, glass, ceramics, and the like.

Note that in the examples described above in which at least one of the pressing faces 124, 124 defining the constricted flow path 121 is formed by an outer peripheral face of the rollers 123, the abrasive grains 72 on the surface of the cores 71 may pass through without being sufficiently pressed if the rotation speed of the roller 123 is too fast, resulting in a weak combining strength of the abrasive grains 72 to the cores 71, and in the abrasive grains 72 in the elastic abrasive 70 regenerated in this manner being easily fallen off from the surface in use.

However, if the rotation speed of the rollers 123 is too slow, then this decreases the amount of elastic abrasive 70 regenerated and so regeneration may not keep up. Moreover, the surface of the cores 71 having adhesive properties may be externally exposed between the abrasive grains 72 adhered to the surface when passing between the rollers 123, 123, leading to the cores 71 adhering and clumping together, and resulting in the elastic abrasive 70 no longer being reusable.

The rotation speed at the surface of the rollers 123 is accordingly preferably from 1 m/min to 50 m/min, and more preferably from 5 m/min to 30 m/min.

Abrasive Grain Feeder

Any structure may be employed for the configuration of the abrasive grain feeder 13 for feeding the abrasive grains into the mixer 11, as long as a configuration capable of quantitative feeding of abrasive grains at a pre-set feed rate into the mixer 11 is adopted. For example an abrasive grain feeder 13 having a comparatively simple structure may be employed in which a hole or slit of a specific dimension is provided in a bottom section of a hopper for storing the abrasive grains, and then the abrasive grains are fed into the mixer 11 by passing through the hole or slit.

In order to achieve smooth feeding of the abrasive grains, preferably vibration is imparted to the hopper storing the abrasive grains. In particular, the cohesive force is strong in cases in which fine abrasive grains having an abrasive grain size finer than 3000 grit (D50: 11 μm) are employed, and so the application of ultrasound vibration is required in such cases since such fine abrasive grains are not able to be conveyed otherwise.

Figure 7:
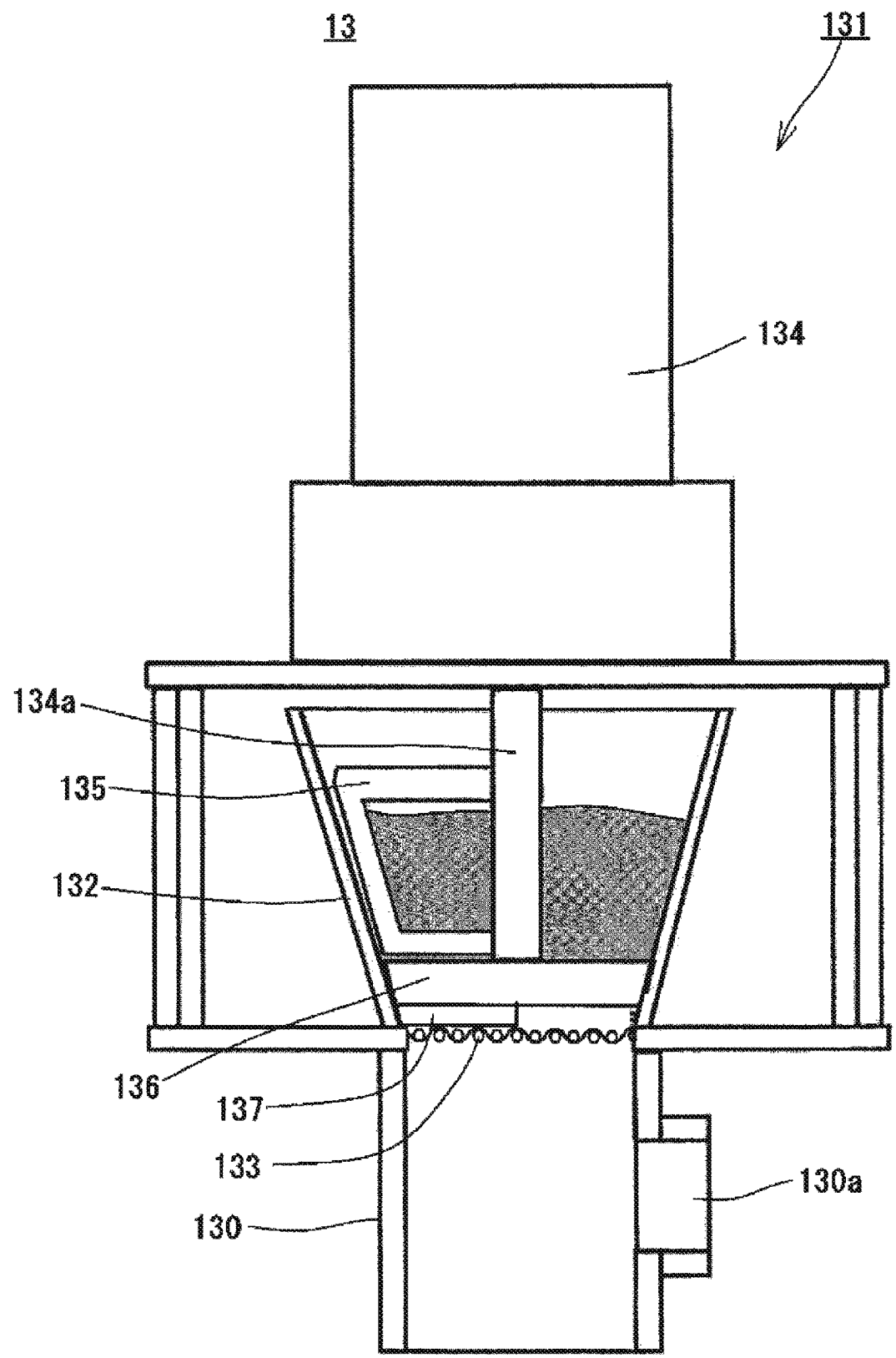
FIG. 7 is a schematic diagram of an abrasive grain feeder.
Figure 8A:
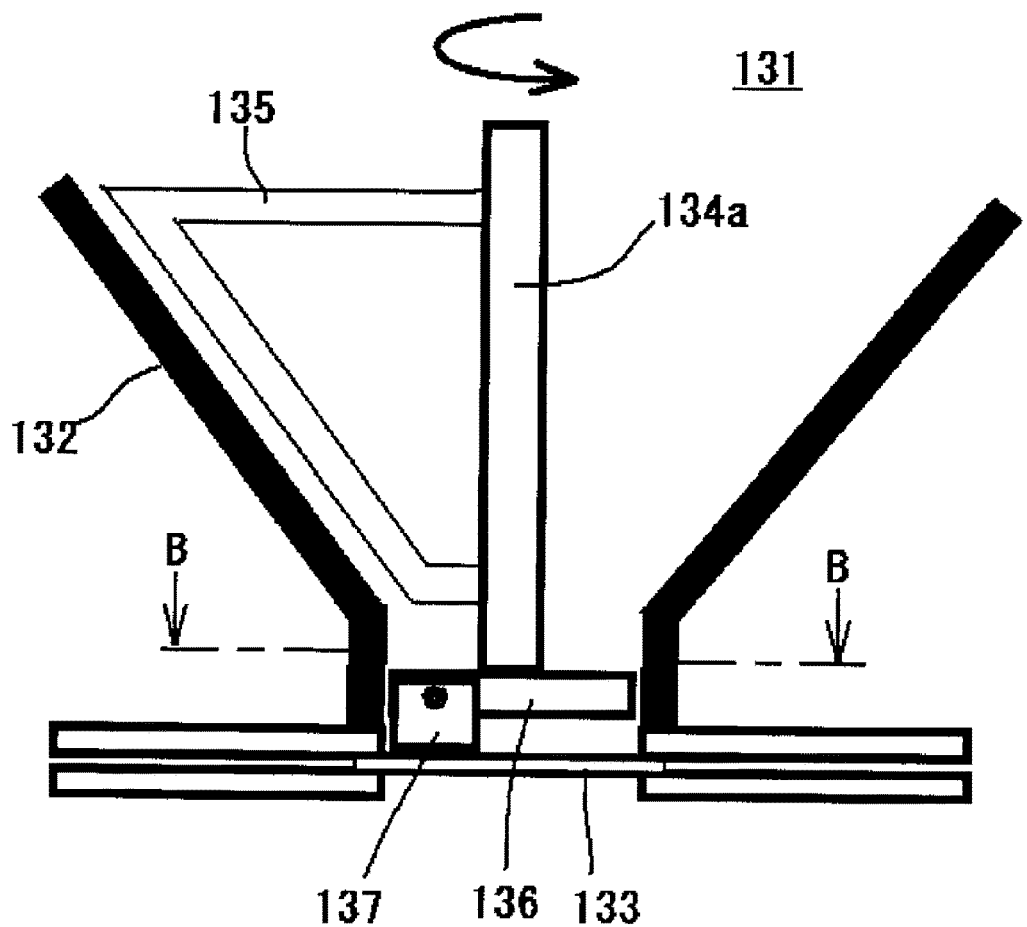
FIG. 8A and FIG. 8B are schematic diagrams of an abrasive grain metering means.
Figure 8B:
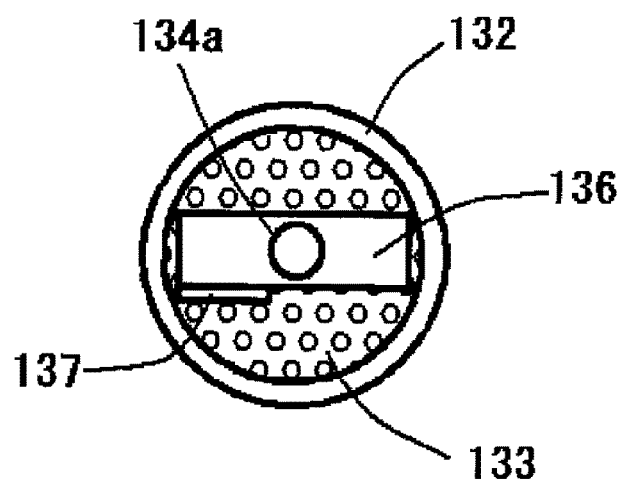

In the present exemplary embodiment, the abrasive grain metering means 131 illustrated in FIG. 7 and FIG. 8 is provided in the abrasive grain feeder 13 so as to enable accurate metering and feeding of such fine abrasive grains, and in particular of abrasive grains of 6000 grit (D50: 2 μm) or finer which have a strong cohesive force.

The abrasive grain feeder 13 equipped with such an abrasive grain metering means 131 is configured including a screen 133 disposed below a hopper 132 formed in a funnel shape. The screen 133 is configured from perforated metal or mesh formed with multiple small holes of from 0.1 mm to 2 mm in a configuration in which abrasive grains poured into the hopper 132 are allowed to fall onto the screen 133. A stirring blade 135 that rotates inside the hopper 132, and a scraper 136 that rotates over the screen 133, are attached to a rotation shaft 134a provided to a stirring motor 134 disposed above the hopper 132, in a configuration enabling the stirring blade 135 and the scraper 136 to be rotated accompanying rotation of the stirring motor 134.

A blade 137 that makes sliding contact with the surface of the screen 133 as the scraper 136 rotates is provided to the scraper 136 in a configuration such that the abrasive grains can be caused by the blade 137 to fall through the small holes formed in the screen 133.

Thus by rotating the stirring motor 134 in a state in which the abrasive grains have been poured into the hopper 132, the abrasive grains in the hopper 132 are stirred by the stirring blade 135 and fall onto the screen 133.

These abrasive grains are fed into the small holes in the screen 133 by the blade 137 due to the rotation of the scraper 136, and the abrasive grains pass through the small holes in the screen 133 and fall downwards at small quantities each time.

Thus in the abrasive grain feeder 13 equipped with the abrasive grain metering means 131 configured as described above, the abrasive grain feed rate can be increased by speeding up the rotation speed of the stirring motor 134, and conversely the abrasive grain feed rate can be decreased by lowering the rotation speed of the stirring motor 134. A configuration is accordingly achieved such that the abrasive grain feed rate can be varied by controlling the rotation speed of the stirring motor 134.

An abrasive grain receiver 130 into which abrasive grains that have passed through the screen 133 fall is communicated through the abrasive grain feed pipe 42 with the abrasive grain intake chamber 112 provided in the mixer 11. When a compressed gas is fed into the mixer 11 through the first air jet 116 and a negative pressure is induced in the abrasive grain intake chamber 112, abrasive grains are fed into the mixer 11 together with the external air that has been sucked in through an external air intake port 130a provided to the abrasive grain receiver 130.

Detection Means and Control Means (Feedback Control)

In the blasting device 1 of the present invention in which the abrasive grain metering means 131 is provided to the abrasive grain feeder 13 to vary the abrasive grain feed rate, a configuration may be adopted in which a detection means 14 is provided to measure the adhered amount of abrasive grains to the cores of the regenerated elastic abrasive obtained by the combining unit 12, so as to control the rate at which the abrasive grains are fed into the mixer 11 by feedback according to detection results from the detection means 14.

The measurement of the adhered amount of abrasive grains may, for example, be derived based on images from imaging the surface of particles of regenerated elastic abrasive extracted as a sample of the regenerated elastic abrasive obtained, and derived as a ratio of the number of pixels of portions where abrasive grains are adhered with respect to the number of pixels of portions where no abrasive grains are adhered. However, in the present exemplary embodiment the adhered amount of abrasive grains is measured by the angle of repose of the regenerated elastic abrasive, which is the pile angle formed when regenerated elastic abrasive is piled up in a cone shape.

Namely, as the adhered amount of abrasive grains changes, the larger the exposed surface area of the core surface that has adhesive properties, the more easily the particles of the obtained regenerated elastic abrasive adhere to each other and cohere together, and the smaller the exposed surface area of the core surface, the less likely particles of the regenerated elastic abrasive are to cohere together. As a result, the angle of repose is greater in cases in which there is insufficient adhering of the abrasive grains to the core and the core is exposed. This means that the adhered state of abrasive grains to the core surface can be measured by measuring the angle of repose of the regenerated elastic abrasive.

Various sensors or a CCD camera or the like may be employed as examples of the detection means 14 for measuring such an angle of repose. For example, the regenerated elastic abrasive may be piled up on a circular disc provided at a position not liable to be affected by the surroundings until the regenerated elastic abrasive starts to fall off, and the angle of repose measured based on a video imaging the angle of repose of the piled up regenerated elastic abrasive or based on the height of the pile.

A detection chamber 50 in communication with the blasting chamber 8 is provided in the illustrated exemplary embodiment. The regenerated elastic abrasive is allowed to fall onto a detection plate 51 provided inside the detection chamber 50 and to pile up thereon, and the regenerated elastic abrasive that has fallen from the detection plate 51 is allowed to fall into the blasting chamber 8, so as to enable the regenerated elastic abrasive to be returned to the abrasive re-circulation system. This enables a detection process by the detection means 14 to be performed in a continuous sequence of actions.

The angle of repose of the regenerated elastic abrasive measured by the detection means 14 in this manner is sent to the control means 15.

The control means 15 is, for example, a microcontroller for controlling the rotation speed of the stirring motor 134 provided to the abrasive grain feeder 13 based on the angle of repose received from the detection means 14. Based on pre-stored correspondence relationships between the angle of repose and the rotation speed of the stirring motor 134, the microcontroller then speeds up the rotation speed of the stirring motor 134 and increases the abrasive grain feed rate in cases in which measured angle of repose is greater than a target angle of repose, so as to make the measured angle of repose approach the target angle of repose and obtain regenerated elastic abrasive of a constant quality.

Modified Examples Etc.

In the blasting device 1 of the present invention as described above, a configuration has been described in which the elastic abrasive regeneration device 10 is provided outside the abrasive re-circulation system of the blasting device 1, and some of the elastic abrasive recovered in the abrasive recovery section 20 is regenerated. However, for example, the mixer 11 and the combining unit 12 may be provided on a flow path from the abrasive recovery section 20 to the abrasive ejection means 30, and all of the elastic abrasive recovered in the abrasive re-circulation system subjected to the regeneration process.

Moreover, although an example has been described above of a case in which the elastic abrasive regeneration device 10 is provided as one configuration element of the blasting device 1, the elastic abrasive regeneration device 10 described above may be detached from the blasting device 1, and employed as a standalone elastic abrasive manufacturing device.

In such cases, the recovered abrasive 70' described as being the target for regeneration in the elastic abrasive regeneration device 10 of the above exemplary embodiment may be replaced with unused cores 71 or by cores 71 that have already been used.

EXAMPLE

Description follows regarding the results of tests performed to check the performance of the blasting device of the present invention equipped with the elastic abrasive regeneration device.

Test Aims

The aim of the tests was to confirm that there was no reduction in cutting performance when performing blasting using the blasting device of the present invention equipped with the elastic abrasive regeneration device, and to confirm that stable cutting performance could be obtained for a prolonged period of time therewith.

Test Method

The elastic abrasive employed was configured by cores made of an elastomer with self-adhesive properties (having an average major axis dimension of from 0.3 mm to 1.0 mm), with 10000 grit (D50: 0.6 µm) diamond abrasive grains adhered to the surface thereof at an amount of 30% by weight relative to the cores ("Series Z" manufactured by Fuji Manufacturing Co., Ltd).

The blasting device employed in the Example was based on a commercially available pneumatic blasting device ("SFZ-2" manufactured by Fuji Manufacturing Co., Ltd), and provided with the elastic abrasive regeneration device described with reference to FIG. 1 and FIG. 2. On the other hand, the blasting device employed in the Comparative Example was based on the pneumatic blasting device ("SFZ- 2" manufactured by Fuji Manufacturing Co., Ltd), and provided with a configuration in which the mixer 11 of the elastic abrasive regeneration device described with reference to FIG. 1 and FIG. 2 alone (i.e. a configuration in which the recovered abrasive 70' that has passed through the mixer 11 is then returned to the abrasive recovery section 20 without passing through the combining unit 12). Feedback control was not performed in either the Example of the Comparative Example. Blasting was performed continuously therewith under the conditions listed in Table 1 on a test piece (a 90 mm square of 2 mm thick SUS 304 sheet), and changes to the treatment state with the passage of treatment time were observed.

TABLE 1

Blasting Conditions (Common to Example and Comparative Example)

| | |
|---|---|
| Blasting device | SFZ-2 (Manufactured by Fuji Manufacturing Co., Ltd) |
| Elastic abrasive | SID#10000 (manufactured by Fuji Manufacturing Co., Ltd) |
| Abrasive grains employed for regeneration (grain size) | Diamond (10000 grit) |
| Quantity of elastic abrasive | 1000 g |
| Blast gun | F2-1 model, 9 mm diameter (manufactured by Fuji Manufacturing Co., Ltd) |
| Treatment pressure | 0.3 MPa |
| Ejection Treatment path | 2000 g/min |
| rate Regeneration path | 200 g/min |
| Ejection direction and ejection distance (between gun and workpiece) | 20 mm in a vertical direction |
| Ejection angle (gun inclination angle) | 20° |
| Treatment workpiece (test piece) | SUS 304 sheet (90 mm × 90 mm × 2 mm) |
| Regeneration abrasive grains feed rate | 0.045 g/min |

Note that the combining unit provided in the abrasive regeneration device of the blasting device of the Example is a roller type of combining unit with the configuration stated in Table 2 below.

TABLE 2

Configuration of Combining unit Provided to Blasting Device of Example

| | |
|---|---|
| Type | Roller type |
| Roller shape | Cylindrical, 50 mm diameter, 80 mm length |
| Roller material | S45C |
| Roller surface roughness | Ra 0.088 μm |
| Number of rollers | One pair (one stage) |
| Roller separation (width at narrow separation section) | 1.0 mm |
| Roller rotation speed | 116 min$^{-1}$ (about 18 m/min) |

Test Results

Figure 9:
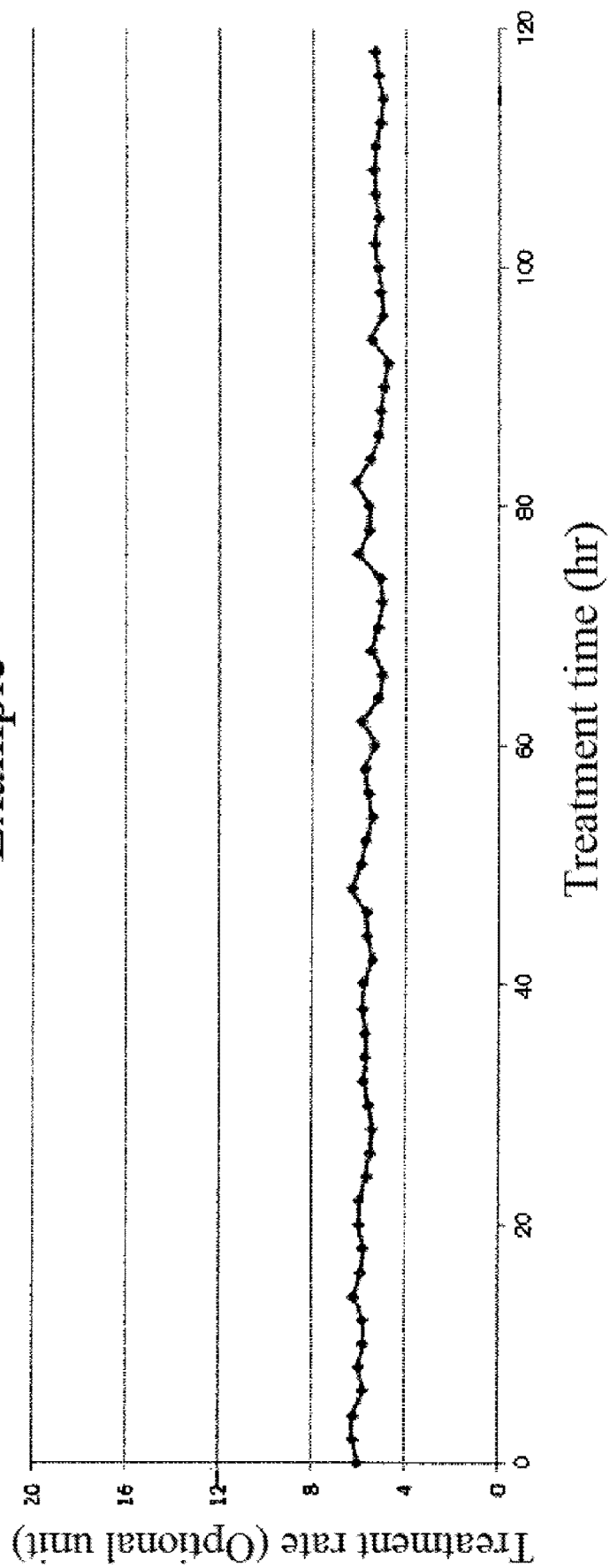
FIG. 9 is a graph illustrating changes in cutting rate with respect to ejection time in a blasting device (Example) of the present invention.

FIG. 9 illustrates changes to a relationship between ejection time and treatment rate (cutting rate) as blasting is performed using the blasting device of the present invention equipped with the elastic abrasive regeneration device.

As is apparent from FIG. 9, the blasting performed using the blasting device of the present invention was confirmed to enable blasting to be performed at a stable treatment rate for a prolonged period of time (a 120 hour duration) from the start of treatment to completion of the test (FIG. 9).

The above results enabled confirmation that in the blasting device of the present invention, elastic abrasive is regenerated in a suitable manner by the elastic abrasive regeneration device.

However, in the blasting device of the Comparative Example, fragments of cores of the elastic abrasive from which abrasive grains have been fallen off start to adhere to the workpiece after the elapse of 0.5 hours from the start of blasting, and the adhered amount of cores to the workpiece increased for 3 hours of treatment, at which point normal treatment was no longer possible.

In the blasting device of the Comparative Example, mixing of the recovered abrasive and the abrasive grains was also performed by the mixer, and new abrasive grains were adhered to the core surface of the recovered abrasive where the surface had been exposed by abrasive grains being fallen off.

However, the blasting device of the Comparative Example was not equipped with a combining unit, and so the abrasive grains adhered by the mixer did not combine with the surface of the cores, and it is thought that as a result of this the abrasive grains adhered in the mixer were readily fallen off, so that the core was exposed and adhered to the workpiece.

The configuration in which a combining unit is provided in the elastic abrasive regeneration device and the abrasive grains are pressed against the surface of the cores was accordingly confirmed to be extremely effective in combining the abrasive grains strongly to the surface of the core.

Thus the broadest claims that follow are not directed to a machine that is configured in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described;

DESCRIPTION OF REFERENCE NUMERALS

1 Blasting device
7 Cabinet
8 Blasting chamber
10 Elastic abrasive regeneration device
11 Mixer
   111 First body
   112 Abrasive grain intake chamber
   112a Intake port
   113 Second body
   114 Recovered abrasive intake chamber 114a Intake port
115 Intermediate housing
116 First air jet
117 Second air jet
118 Outlet
12 Combining unit
  121, 121' Constricted flow path
  122 Flat plate
  123 Roller
  124 Pressing face
  125 Wide separation section
  126 Narrow separation section
  127 Hopper
  129 Straight flow path
13 Abrasive grain feeder
  130 Abrasive grain receiver
  130a External air intake port
  131 Abrasive grain metering means
  132 Hopper
  133 Screen
  134 Stirring motor
  134a Rotation shaft
  135 Stirring blade
  136 Scraper
  137 Blade
14 Detection means
15 Control means
16a,16b Pipeline
20 Abrasive recovery section
25 Extractor fan (blower)
26 Dust collector
30 Abrasive ejection means (blast gun)
41 Abrasive feed pipe
42 Abrasive grain feed pipe
43 Recovered abrasive feed pipe
50 Detection chamber
51 Detection plate
70 Elastic abrasive
70' Used recovered abrasive
71 Core
72 Abrasive grain

The invention claimed is:

1. A method of manufacturing an elastic abrasive having a structure in which abrasive grains have been combined to a surface of cores that are formed from an elastic material and at least the surface has adhesive properties, the elastic abrasive manufacturing method comprising: a mixing process in which the cores and the abrasive grains are mixed together and the abrasive grains are adhered to the surface of the cores; and a combining process in which the abrasive grains are pressed against and combined to the surface of the cores by passing the cores that have completed the mixing process through a first constricted flow path having a gradually narrowing flow path cross-sectional area with the cores in an aggregated state so as to compress the cores.

2. The elastic abrasive manufacturing method of claim 1, wherein the combining process is executed by forming the first constricted flow path between two pressing faces arranged such that a spacing therebetween gradually narrows on progression from a wide separation section to a narrow separation section, and passing the cores that have completed the mixing process along the first constricted flow path from the wide separation section toward the narrow separation section.

3. The elastic abrasive manufacturing method of claim 2, wherein at least one of the pressing faces is formed by an outer peripheral face of a cylindrical roller, and the combining process is executed by rotating the roller so that the pressing face formed by the outer peripheral face of the roller moves along the first constricted flow path from the wide separation section toward the narrow separation section.

4. The elastic abrasive manufacturing method of claim 1, wherein a second constricted flow path is arranged in series with the first constricted flow path, and after passing the cores that have completed the mixing process through the first constricted flow path provided upstream, the cores are also passed through the second constricted flow path provided downstream of the first constricted flow path, so that pressing of the abrasive grains against the surface of the cores in the combining process is performed a plurality of times.

5. The elastic abrasive manufacturing method of claim 4, wherein a flow path cross-sectional area of a narrow separation section of the second constricted flow path is narrower than a flow path cross-sectional area of a narrow separation section of the first constricted flow path, and a pressing force of the abrasive grains against the surface of the cores in the combining process is progressively raised in stages.

6. A device for manufacturing an elastic abrasive having a structure in which abrasive grains have been combined to a surface of cores that are formed from an elastic material and at least the surface has adhesive properties, the elastic abrasive manufacturing device comprising: a mixer configured to mix the cores and the abrasive grains together and to adhere the abrasive grains to the surface of the cores; and a combining unit including at least one constricted flow path having a gradually narrowing flow path cross-sectional area, with the cores that have been mixed in the mixer being passed through the combining unit in an aggregated state.

7. The elastic abrasive manufacturing device of claim 6, wherein the at least one constricted flow path is formed between two pressing faces arranged such that a spacing therebetween gradually narrows from a wide separation section to a narrow separation section.

8. The elastic abrasive manufacturing device of claim 7, wherein at least one of the two pressing faces is formed by an outer peripheral face of a cylindrical roller, and the roller is configured so as to be rotatable such that the at least one of the two pressing faces formed by the outer peripheral face of the roller moves along the at least one constricted flow path from the wide separation section toward the narrow separation section.

9. The elastic abrasive manufacturing device of claim 6, wherein the at least one constricted flow path comprises a plurality of the constricted flow paths arranged in series.

10. The elastic abrasive manufacturing device of claim 9, wherein in comparison to a flow path cross-sectional area of a narrow separation section of the at least one constricted flow path arranged upstream in the plurality of constricted flow paths, a flow path cross-sectional area of a narrow separation section of a second constricted flow path of the plurality of constricted flow paths arranged downstream of the at least one constricted flow path is narrower.

\* \* \* \* \*